US010783497B2

(12) United States Patent
Kenthapadi et al.

(10) Patent No.: US 10,783,497 B2
(45) Date of Patent: Sep. 22, 2020

(54) JOB POSTING DATA SEARCH BASED ON INTERCOMPANY WORKER MIGRATION

(71) Applicant: Microsoft Technology Licensing, LLC, Redmond, WA (US)

(72) Inventors: Krishnaram Kenthapadi, Sunnyvale, CA (US); Kaushik Rangadurai, Sunnyvale, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 519 days.

(21) Appl. No.: 15/437,649

(22) Filed: Feb. 21, 2017

(65) Prior Publication Data

US 2018/0240071 A1    Aug. 23, 2018

(51) Int. Cl.
*G06Q 10/10* (2012.01)
*H04L 29/08* (2006.01)
*G06N 20/00* (2019.01)
*G06Q 50/00* (2012.01)

(52) U.S. Cl.
CPC ......... *G06Q 10/1053* (2013.01); *G06N 20/00* (2019.01); *H04L 67/306* (2013.01); *G06Q 50/01* (2013.01)

(58) Field of Classification Search
USPC ................................................. 705/321, 319
See application file for complete search history.

(56) References Cited

U.S. PATENT DOCUMENTS

| 7,185,065 | B1 * | 2/2007 | Holtzman | ............ G06F 17/2745 |
| | | | | 705/36 R |
| 7,818,396 | B2 | 10/2010 | Dolin et al. | |
| 8,713,000 | B1 * | 4/2014 | Elman | .................... G06Q 30/08 |
| | | | | 707/722 |
| 8,849,813 | B1 | 9/2014 | Iyer et al. | |

(Continued)

OTHER PUBLICATIONS

Navneet Kapur et al., Ranking Universities Based on Career Outcomes of Graduates, KDD '16 Proceedings of the 22nd ACM SIGKDD International Conference on Knowledge Discovery and Data Mining, Aug. 17, 2016, at 137-144, available at https://dl.acm.org/citation.cfm?id=2939701. (Year: 2016).*

(Continued)

*Primary Examiner* — Andrew B Whitaker
*Assistant Examiner* — Johnathan J Lindsey, III
(74) *Attorney, Agent, or Firm* — Schwegman Lundberg & Woessner, P.A.

(57) ABSTRACT

Methods, systems, and computer programs are presented for searching jobs for a member of a social network based on transitions of workers between companies. One method includes an operation for identifying jobs based on a search for jobs for the member who works for an employer, with each job being associated with a respective company. For each company associated with the jobs, the method determines an intercompany migration score indicating a transition probability that a coworker transitions from the employer to the company. For each job, a job affinity score is determined based on a comparison of job data and a member profile. Further, the method includes operations for (Continued)

ranking the jobs based on the intercompany migration score of the company and the job affinity score, and for causing presentation of a group including one or more of the ranked jobs in a user interface based on the ranking.

17 Claims, 14 Drawing Sheets

(56) References Cited

U.S. PATENT DOCUMENTS

| | | | |
|---|---|---|---|
| 8,914,383 B1 | 12/2014 | Weinstein et al. | |
| 9,251,470 B2 | 2/2016 | Hua et al. | |
| 9,536,226 B2 | 1/2017 | Elman et al. | |
| 10,607,189 B2 | 3/2020 | Kenthapadi et al. | |
| 2003/0220811 A1 | 11/2003 | Fan et al. | |
| 2004/0143469 A1 | 7/2004 | Lutz et al. | |
| 2004/0219493 A1 | 11/2004 | Phillips | |
| 2004/0243560 A1 | 12/2004 | Broder et al. | |
| 2006/0004869 A1 | 1/2006 | Yuster et al. | |
| 2006/0042483 A1 | 3/2006 | Work et al. | |
| 2006/0229896 A1 | 10/2006 | Rosen et al. | |
| 2006/0229902 A1 | 10/2006 | Mcgovern et al. | |
| 2006/0265258 A1 | 11/2006 | Powell et al. | |
| 2006/0265269 A1 | 11/2006 | Hyder et al. | |
| 2007/0288308 A1* | 12/2007 | Chen | G06Q 30/0254 705/14.52 |
| 2008/0115173 A1 | 5/2008 | Ellis et al. | |
| 2008/0140656 A1 | 6/2008 | Panda | |
| 2008/0243637 A1 | 10/2008 | Chan et al. | |
| 2009/0222430 A1 | 9/2009 | Hobson et al. | |
| 2010/0057659 A1* | 3/2010 | Phelon | G06Q 10/00 706/46 |
| 2010/0100546 A1 | 4/2010 | Kohler | |
| 2010/0324970 A1 | 12/2010 | Phelon et al. | |
| 2010/0332405 A1 | 12/2010 | Williams | |
| 2011/0184958 A1 | 7/2011 | Krishnamoorthy et al. | |
| 2011/0238591 A1* | 9/2011 | Kerr | G06Q 10/1053 705/321 |
| 2012/0016817 A1* | 1/2012 | Smith | G06N 20/00 706/12 |
| 2012/0197863 A1 | 8/2012 | Skomoroch et al. | |
| 2013/0013526 A1* | 1/2013 | Le Viet | G06Q 10/06 705/319 |
| 2013/0110593 A1 | 5/2013 | Fowler | |
| 2013/0124474 A1 | 5/2013 | Anderson | |
| 2013/0138588 A1 | 5/2013 | Mehta et al. | |
| 2013/0166358 A1* | 6/2013 | Parmar | G06Q 10/06393 705/7.39 |
| 2013/0198099 A1 | 8/2013 | Hyder et al. | |
| 2013/0290205 A1 | 10/2013 | Bonmassar et al. | |
| 2013/0297373 A1* | 11/2013 | Proux | G06Q 50/01 705/7.28 |
| 2014/0025748 A1 | 1/2014 | Mallet et al. | |
| 2014/0122355 A1* | 5/2014 | Hardtke | G06Q 10/105 705/321 |
| 2014/0129460 A1 | 5/2014 | Budzienski et al. | |
| 2014/0136434 A1* | 5/2014 | Posse | G06Q 50/01 705/319 |
| 2014/0143165 A1* | 5/2014 | Posse | G06Q 10/1053 705/319 |
| 2014/0164994 A1 | 6/2014 | Myslinski | |
| 2014/0188681 A1 | 7/2014 | Shahghasemi | |
| 2014/0214943 A1 | 7/2014 | Shapero et al. | |
| 2014/0214945 A1* | 7/2014 | Zhang | H04L 67/306 709/204 |
| 2014/0237046 A1 | 8/2014 | Brooks et al. | |
| 2014/0244335 A1 | 8/2014 | Baldwin et al. | |
| 2014/0244520 A1 | 8/2014 | Wurtele et al. | |
| 2014/0244530 A1 | 8/2014 | Baldwin et al. | |
| 2014/0244531 A1 | 8/2014 | Baldwin et al. | |
| 2014/0244561 A1* | 8/2014 | Cheng | G06Q 50/01 706/46 |
| 2014/0258288 A1 | 9/2014 | Work et al. | |
| 2014/0279629 A1 | 9/2014 | Mcconnell | |
| 2014/0279632 A1* | 9/2014 | Andersen | G06Q 10/1053 705/321 |
| 2014/0358607 A1 | 12/2014 | Gupta et al. | |
| 2015/0006422 A1 | 1/2015 | Carter et al. | |
| 2015/0019640 A1 | 1/2015 | Li et al. | |
| 2015/0046353 A1 | 2/2015 | Elman et al. | |
| 2015/0046356 A1* | 2/2015 | Millmore | G06Q 10/1053 705/321 |
| 2015/0100510 A1 | 4/2015 | Sachdev | |
| 2015/0120717 A1 | 4/2015 | Kim et al. | |
| 2015/0127400 A1 | 5/2015 | Chan et al. | |
| 2015/0127565 A1 | 5/2015 | Chevalier et al. | |
| 2015/0220880 A1 | 8/2015 | Maipady et al. | |
| 2015/0248648 A1* | 9/2015 | Rao | G06Q 10/1053 705/321 |
| 2015/0278960 A1 | 10/2015 | Moore et al. | |
| 2015/0287051 A1 | 10/2015 | Baig et al. | |
| 2015/0317753 A1 | 11/2015 | Goel et al. | |
| 2015/0317759 A1* | 11/2015 | Jing | G06Q 10/10 705/328 |
| 2015/0317760 A1* | 11/2015 | Pham | G06Q 50/20 705/328 |
| 2015/0339938 A1 | 11/2015 | Sampath | |
| 2015/0347606 A1 | 12/2015 | Goel et al. | |
| 2015/0370798 A1 | 12/2015 | Ju et al. | |
| 2016/0034853 A1 | 2/2016 | Wang et al. | |
| 2016/0055159 A1 | 2/2016 | Connolly et al. | |
| 2016/0098683 A1 | 4/2016 | Angulo et al. | |
| 2016/0191450 A1 | 6/2016 | Lineberger et al. | |
| 2016/0267522 A1 | 9/2016 | Schellenberger et al. | |
| 2016/0292643 A1 | 10/2016 | Rodriguez et al. | |
| 2016/0314200 A1 | 10/2016 | Markman et al. | |
| 2016/0321362 A1* | 11/2016 | Lytkin | G06F 16/9535 |
| 2016/0343005 A1* | 11/2016 | Liu | G06Q 30/0201 |
| 2016/0379170 A1 | 12/2016 | Pande | |
| 2017/0004454 A1* | 1/2017 | Tang | G06F 16/9535 |
| 2017/0032386 A1 | 2/2017 | Borza | |
| 2017/0046439 A1 | 2/2017 | Gellis et al. | |
| 2017/0109850 A1 | 4/2017 | Chetlur et al. | |
| 2017/0236095 A1* | 8/2017 | Schreiber | G06F 3/0482 705/321 |
| 2017/0249594 A1 | 8/2017 | Ortigas et al. | |
| 2017/0255997 A1* | 9/2017 | Watson | G06Q 40/06 |
| 2017/0270456 A1 | 9/2017 | Branagh et al. | |
| 2017/0301040 A1 | 10/2017 | Scafaria | |
| 2017/0359273 A1 | 12/2017 | Dubey et al. | |
| 2018/0068271 A1 | 3/2018 | Abebe et al. | |
| 2018/0218326 A1 | 8/2018 | Kenthapadi et al. | |
| 2018/0218327 A1 | 8/2018 | Kenthapadi et al. | |
| 2018/0218328 A1 | 8/2018 | Kenthapadi et al. | |
| 2018/0225632 A1 | 8/2018 | Kenthapadi et al. | |
| 2018/0225633 A1 | 8/2018 | Kenthapadi et al. | |
| 2018/0232751 A1* | 8/2018 | Terhark | G06N 7/005 |
| 2018/0285822 A1 | 10/2018 | Kenthapadi et al. | |
| 2018/0285823 A1 | 10/2018 | Kenthapadi et al. | |
| 2018/0285824 A1 | 10/2018 | Kenthapadi et al. | |
| 2018/0315019 A1 | 11/2018 | Kenthapadi et al. | |

OTHER PUBLICATIONS

Kapur (Navneet Kapur etal., Ranking Universities Based on CareerOutcomes of Graduates, KDD '16 Proceedings of the 22nd ACM SIGKDD International Conference on Knowledge Discovery and Data Mining, Aug. 17, 2016, at 137-144, available at https://dl.acm.org/citation.cfm?id=2939701.) (Year: 2016).*

15437649 NPL—EIC 3600 Search Report dated Jan. 21, 2020 (Year: 2020).*

"2012-2013 Student Internship/Co-op and Full-Time Outcome Report", Retrieved from: https://web.archive.org/web/20190531052602/https://cdn.uconnectlabs.com/wp-content/uploads/sites/15/2016/05/StudentOutcomes20122013Final.pdf, May 31, 2019, 11 Pages.

"Applicant Initiated Interview Summary Issued in U.S. Appl. No. 15/379,624", dated Apr. 26, 2019, 4 Pages.

"Non Final Office Action Issued in U.S. Appl. No. 15/379,624", dated Jan. 31, 2019, 40 Pages.

(56) References Cited

OTHER PUBLICATIONS

"Applicant Initiated Interview Summary Issued in U.S. Appl. No. 15/379,676", dated May 21, 2019, 4 Pages.
"Final Office Action Issued in U.S. Appl. No. 15/379,676", dated Jul. 30, 2019, 51 Pages.
"Non Final Office Action Issued in U.S. Appl. No. 15/379,676", dated Jan. 25, 2019, 35 Pages.
"Applicant Initiated Interview Summary Issued in U.S. Appl. No. 15/379,686", dated Apr. 26, 2019, 04 Pages.
"Final Office Action Issued in U.S. Appl. No. 15/379,686", dated Aug. 14, 2019, 42 Pages.
"Non Final Office Action Issued in U.S. Appl. No. 15/379,686", dated Jan. 24, 2019, 37 Pages.
"Applicant Initiated Interview Summary Issued in U.S. Appl. No. 15/419,174", dated Apr. 26, 2019, 03 Pages.
"Final Office Action Issued in U.S. Appl. No. 15/419,174", dated Aug. 6, 2019, 13 Pages.
"Non Final Office Action Issued in U.S. Appl. No. 15/419,174", dated Jan. 11, 2019, 12 Pages.
"Applicant Interview Summary Issued in U.S. Appl. No. 15/419,231", dated Apr. 26, 2019, 3 Pages.
"Final Office Action Issued in U.S. Appl. No. 15/419,231", dated Aug. 7, 2019, 14 Pages.
"Non Final Office Action Issued in U.S. Appl. No. 15/419,231", dated Jan. 18, 2019, 12 Pages.
"Non Final Office Action Issued in U.S. Appl. No. 15/424,051", dated Feb. 8, 2019, 25 Pages.
"Non Final Office Action Issued in U.S. Appl. No. 15/424,082", dated Mar. 21, 2019, 31 Pages.
"Applicant Initiated Interview Summary Issued in U.S. Appl. No. 15/478,802", dated Mar. 1, 2019, 3 Pages.
"Final Office Action Issued in U.S. Appl. No. 15/478,802", dated May 21, 2019, 16 Pages.
"Non Final Office Action Issued in U.S. Appl. No. 15/478,802", dated Nov. 28, 2018, 15 Pages.
"Applicant Initiated Interview Summary Issued in U.S. Appl. No. 15/478,821", dated Apr. 1, 2019, 3 Pages.
"Final Office Action Issued in U.S. Appl. No. 15/478,821", dated May 22, 2019, 14 Pages.
"Non Final Office Action Issued in U.S. Appl. No. 15/478,821", dated Dec. 27, 2018, 13 Pages.
"Non Final Office Action Issued in U.S. Appl. No. 15/478,843", dated May 9, 2019, 11 Pages.
"Non Final Office Action Issued in U.S. Appl. No. 15/499,594", dated Aug. 2, 2019, 14 Pages.
Fitzpatrick, et al., "Forming effective worker teams with multi-functional skill requirements", In Journal of Computers & Industrial Engineering, vol. 48, Issue 1, May 1, 2005, pp. 593-608.
Wheelan, Susan A., "Group Size, Group Development, and Group Productivity", In SAGE Publications, vol. 40, Issue 2, Apr. 2009, pp. 247-262.
"Final Office Action Issued in U.S. Appl. No. 15/379,624", dated May 12, 2020, 62 Pages.
"Non Final Office Action Issued in U.S. Appl. No. 15/379,676", dated Mar. 23, 2020, 14 Pages.
"Non Final Office Action Issued in U.S. Appl. No. 15/379,686", dated Mar. 17, 2020, 49 Pages.
"Non Final Office Action Issued in U.S. Appl. No. 15/393,537", dated Apr. 30, 2020, 25 Pages.
"Notice of Allowance Issued in U.S. Appl. No. 15/419,174", dated Mar. 25, 2020, 9 Pages.
"Non Final Office Action Issued in U.S. Appl. No. 15/419,231", dated Mar. 26, 2020, 8 Pages.
"Final Office Action Issued in U.S. Appl. No. 15/424,051", dated May 1, 2020, 41 Pages.
"Non Final Office Action Issued in U.S. Appl. No. 15/478,843", dated Mar. 30, 2020, 11 Pages.
"Final Office Action Issued in U.S. Appl. No. 15/499,594", dated Feb. 10, 2020, 16 Pages.
"Non Final Office Action Issued in U.S. Appl. No. 15/379,624", dated Sep. 30, 2019, 42 Pages.
"Applicant Initiated Interview Summary Issued in U.S. Appl. No. 15/379,686", dated Nov. 22, 2019, 3 Pages.
"Non Final Office Action Issued in U.S. Appl. No. 15/424,051", dated Oct. 21, 2019, 41 Pages.
"Non Final Office Action Issued in U.S. Appl. No. 15/478,802", dated Nov. 13, 2019, 17 Pages.
"Final Office Action Issued in U.S. Appl. No. 15/478,843", dated Oct. 10, 2019, 15 Pages.
"Notice of Allowance Issued in U.S. Appl. No. 15/478,821", dated Dec. 30, 2019, 10 Pages.
"Final Office Action Issued in U.S. Appl. No. 15/424,082", dated Jan. 3, 2020, 45 Pages.

\* cited by examiner

INTERCOMPANY-MIGRATION GROUP

INTERCOMPANY MIGRATION

People from your company that obtained jobs in ⟶ these companies

Interaction Designer
Corp 1
San Francisco, CA
2 days- 80 views - 21 applicants
Joe Alpha, Jane Beta, Jack Gamma

User Experience Designer
Corp 2
Chicago, IL
3 days-15 views- 5 applicants
Joe Delta
Software Developer

Product Designer
Corp 3
New York City, NY
15 days- 347 views- 2 applicants
Jack Epsilon
Mechanical Engineer

Visual Designer
Corp 4
Santa Clara, CA
9 days- 32 views- 13 applicants
Jack Omega and Jane Sigma

Product Designer
Corp 5
San Jose, CA
2 days- 21 views- 9 applicants
Jane Kappa
Product Manager

Product Designer
Corp 6
Portland, OR
30 days- 906 views- 97 applicants
Dick Iota
Business Development

FIG. 5

JOB POSTING DATA SEARCH BASED ON INTERCOMPANY WORKER MIGRATION

TECHNICAL FIELD

The subject matter disclosed herein generally relates to methods, systems, and programs for finding quality job offerings for a member of a social network.

BACKGROUND

Some social networks provide job postings to their members. The member may perform a job search by entering a job search query, or the social network may suggest jobs that may be of interest to the member. However, current job search methods may miss valuable opportunities for a member because the job search engine limits the search to specific parameters. For example, the job search engine may look for matches of a job in the title to the member's title, but there may be quality jobs that are associated with a different title that would be of interest to the member.

Further, existing job search methods may focus only on the job description or the member's profile, without considering the member's preferences for job searches that go beyond the job description or other information that may help find the best job postings for the member.

BRIEF DESCRIPTION OF THE DRAWINGS

Various ones of the appended drawings merely illustrate example embodiments of the present disclosure and cannot be considered as limiting its scope.

FIG. 5 is a detail of an intercompany-migration group area in the user interface of FIG. 4, according to some example embodiments.

DETAILED DESCRIPTION

Figure 1:
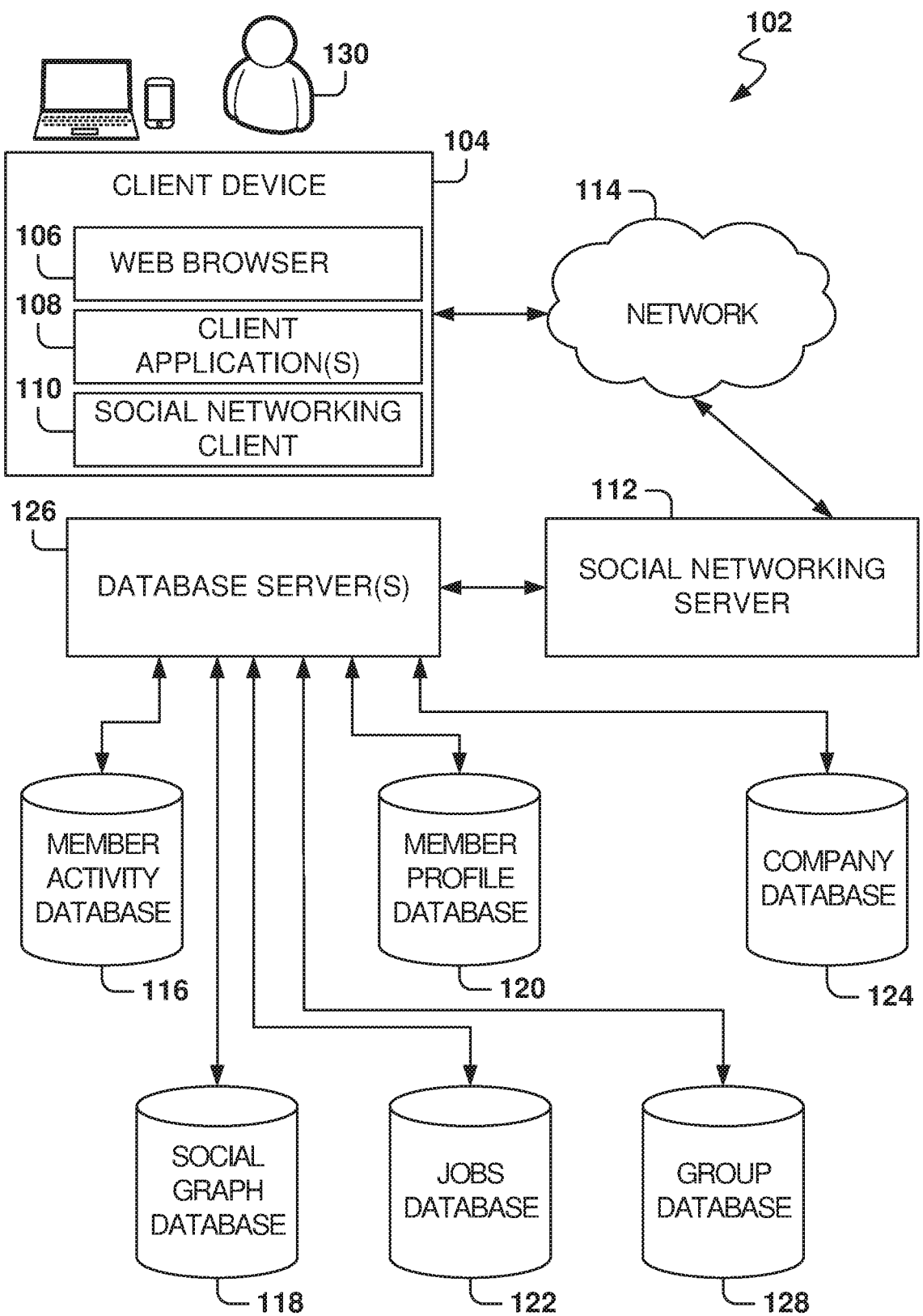
FIG. 1 is a block diagram illustrating a network architecture, according to some example embodiments, including a social networking server.

Example methods, systems, and computer programs are directed to searching job postings for a member of a social network based on the transitions of members between companies. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

One of the goals of the present embodiments is to personalize and redefine how job postings are searched and presented to job seekers. Another goal is to explain better why particular jobs are recommended to the job seekers. The presented embodiments provide both active and passive job seekers with valuable job recommendation insights, thereby greatly improving their ability to find and assess jobs that meet their needs.

Instead of providing a single job recommendation list for a member, embodiments presented herein define a plurality of groups, and the job recommendations are presented within the groups. Each group provides an indication of a feature that is important to the member for selecting from the group, such as how many people have transitioned from the company of the member to the company offering the job, who would be a virtual team for the member if the member joined the company, and the like.

Embodiments presented herein analyze data regarding transitions of members of the social network from one company to another. This way, if a company is hiring a large number of workers from the company of the member, the member will be encouraged to consider job postings from this company, not only because the chances of landing the job will be higher than average, but also because the member would join former colleagues.

One general aspect includes a method including an operation for identifying, by a server having one or more processors, jobs based on a search for jobs for a member of a social network, where the member works for an employer and each job is associated with a respective company. The server also determines, for each company associated with one or more of the jobs, an intercompany migration score indicating a transition probability that a coworker working for the employer transitions to work for the company. The server further determines, for each job, a job affinity score based on a comparison of data of the job and a profile of the member. The server further ranks the jobs based on the intercompany migration score of the company of the job and the job affinity score, and the server causes presentation of a group including one or more of the ranked jobs in a user interface of the member based on the ranking.

One general aspect includes a system including: a memory including instructions and one or more computer processors. The instructions, when executed by the one or more computer processors, cause the one or more computer processors to perform operations including identifying jobs based on a search for jobs for a member of a social network, where the member works for an employer and each job is associated with a respective company. The operations further include determining, for each company associated with one or more of the jobs, an intercompany migration score indicating a transition probability that a coworker working for the employer transitions to work for the company. The operations further include determining, for each job, a job affinity score based on a comparison of data of the job and a profile of the member, and ranking the jobs based on the intercompany migration score of the company of the job and the job affinity score. The operations further include causing presentation of a group including one or more of the ranked jobs in a user interface of the member based on the ranking.

One general aspect includes a non-transitory machine-readable storage medium including instructions that, when executed by a machine, cause the machine to perform operations including identifying jobs based on a search for jobs for a member of a social network, where the member works for an employer and each job is associated with a respective company. The operations further include determining, for each company associated with one or more of the jobs, an intercompany migration score indicating a transition probability that a coworker working for the employer transitions to work for the company. The operations further include determining, for each job, a job affinity score based on a comparison of data of the job and a profile of the member, and ranking the jobs based on the intercompany migration score of the company of the job and the job affinity score. The operations further include causing presentation of a group including one or more of the ranked jobs in a user interface of the member based on the ranking.

FIG. 1 is a block diagram illustrating a network architecture 102, according to some example embodiments, including a social networking server 112. The social networking server 112 provides server-side functionality via a network 114 (e.g., the Internet or a wide area network (WAN)) to one or more client devices 104. FIG. 1 illustrates, for example, a web browser 106 (e.g., the Internet Explorer® browser developed by Microsoft® Corporation), client application(s) 108, and a social networking client 110 executing on a client device 104. The social networking server 112 is further communicatively coupled with one or more database servers 126 that provide access to one or more databases 116-128.

The client device 104 may comprise, but is not limited to, a mobile phone, a desktop computer, a laptop, a portable digital assistant (PDA), a smart phone, a tablet, a book reader, a netbook, a multi-processor system, a microprocessor-based or programmable consumer electronic system, or any other communication device that a user 130 may utilize to access the social networking server 112. In some embodiments, the client device 104 may comprise a display module (not shown) to display information (e.g., in the form of user interfaces). In further embodiments, the client device 104 may comprise one or more of touch screens, accelerometers, gyroscopes, cameras, microphones, global positioning system (GPS) devices, and so forth.

In one embodiment, the social networking server 112 is a network-based appliance that responds to initialization requests or search queries from the client device 104. One or more users 130 may be a person, a machine, or another means of interacting with the client device 104. In various embodiments, the user 130 is not part of the network architecture 102, but may interact with the network architecture 102 via the client device 104 or another means. For example, one or more portions of the network 114 may be an ad hoc network, an intranet, an extranet, a virtual private network (VPN), a local area network (LAN), a wireless LAN (WLAN), a WAN, a wireless WAN (WWAN), a metropolitan area network (MAN), a portion of the Internet, a portion of the Public Switched Telephone Network (PSTN), a cellular telephone network, a wireless network, a Wi-Fi® network, a WiMax network, another type of network, or a combination of two or more such networks.

The client device 104 may include one or more applications (also referred to as "apps") such as, but not limited to, the web browser 106, the social networking client 110, and other client applications 108, such as a messaging application, an electronic mail (email) application, a news application, and the like. In some embodiments, if the social networking client 110 is present in the client device 104, then the social networking client 110 is configured to locally provide the user interface for the application and to communicate with the social networking server 112, on an as-needed basis, for data and/or processing capabilities not locally available (e.g., to access a member profile, to authenticate a user 130, to identify or locate other connected members, etc.). Conversely, if the social networking client 110 is not included in the client device 104, the client device 104 may use the web browser 106 to access the social networking server 112.

Further, while the client-server-based network architecture 102 is described with reference to a client-server architecture, the present subject matter is of course not limited to such an architecture, and could equally well find application in a distributed, or peer-to-peer, architecture system, for example.

In addition to the client device 104, the social networking server 112 communicates with the one or more database server(s) 126 and database(s) 116-128. In one example embodiment, the social networking server 112 is communicatively coupled to a member activity database 116, a social graph database 118, a member profile database 120, a jobs database 122, a group database 128, and a company database 124. Each of the databases 116-128 may be implemented as one or more types of database including, but not limited to, a hierarchical database, a relational database, an object-oriented database, one or more flat files, or combinations thereof.

The member profile database 120 stores member profile information about members who have registered with the social networking server 112. With regard to the member profile database 120, the member may include an individual person or an organization, such as a company, a corporation, a nonprofit organization, an educational institution, or other such organizations.

Consistent with some example embodiments, when a user initially registers to become a member of the social networking service provided by the social networking server 112, the user is prompted to provide some personal information, such as name, age (e.g., birth date), gender, interests, contact information, home town, address, spouse's and/or family members' names, educational background (e.g., schools, majors, matriculation and/or graduation dates, etc.), employment history, professional industry (also referred to herein simply as industry), skills, professional organizations, and so on. This information is stored, for example, in the member profile database 120. Similarly, when a representative of an organization initially registers the organization with the social networking service provided by the social networking server 112, the representative may be prompted to provide certain information about the organization, such as a company industry. This information may be stored, for example, in the member profile database 120. In some embodiments, the profile data may be processed (e.g., in the background or offline) to generate various derived profile data. For example, if a member has provided information about various job titles that the member has held with the same company or different companies, and for how long, this information may be used to infer or derive a member profile attribute indicating the member's overall seniority level, or seniority level within a particular company. In some example embodiments, importing or otherwise accessing data from one or more externally hosted data sources may enhance profile data for both members and organizations. For instance, with companies in particular, financial data may be imported from one or more external data sources, and made part of a company's profile.

In some example embodiments, the company database 124 stores information regarding companies in the member's profile. A company may also be a member, but some companies may not be members of the social network although some of the employees of the company may be members of the social network. The company database 124 includes company information, such as name, industry, contact information, website, address, location, geographic scope, and the like.

As members interact with the social networking service provided by the social networking server 112, the social networking server 112 is configured to monitor these interactions. Examples of interactions include, but are not limited to, commenting on posts entered by other members, viewing member profiles, editing or viewing a member's own profile, sharing content from outside of the social networking service (e.g., an article provided by an entity other than the social networking server 112), updating a current status, posting content for other members to view and comment on, job suggestions for the members, job-post searches, and other such interactions. In one embodiment, records of these interactions are stored in the member activity database 116, which associates interactions made by a member with his or her member profile stored in the member profile database 120. In one example embodiment, the member activity database 116 includes the posts created by the members of the social networking service for presentation on member feeds.

The jobs database 122 includes job postings offered by companies in the company database 124. Each job posting includes job-related information such as any combination of employer, job title, job description, requirements for the job, salary and benefits, geographic location, one or more job skills required, date the job was posted, relocation benefits, and the like.

The group database 128 includes group-related information. As used herein, a group includes jobs that are selected based on a group characteristic that provides an indication of why the jobs in the group are selected for presentation to the member. Examples of group characteristics include inter-company migrations of workers, relationships between an educational institution of the member and the employees of a company who also attended the educational institution, virtual teams in the company with profiles similar to the member's profile, cultural fit of the member within the company, social connections of the member who work at the company, and the like.

Members of the social networking service may establish connections with one or more members of the social networking service. The connections may be defined as a social graph, where the member is represented by a vertex in the social graph and the edges identify connections between vertices. Members are said to be first-degree connections where a single edge connects the vertices representing the members; otherwise, members are said to have connections of the $n^{th}$ degree, where n is defined as the number of edges separating two vertices. In one embodiment, the social graph maintained by the social networking server 112 is stored in the social graph database 118.

In one embodiment, the social networking server 112 communicates with the various databases 116-128 through the one or more database server(s) 126. In this regard, the database server(s) 126 provide one or more interfaces and/or services for providing content to, modifying content in, removing content from, or otherwise interacting with the databases 116-128. For example, and without limitation, such interfaces and/or services may include one or more Application Programming Interfaces (APIs), one or more services provided via a Service-Oriented Architecture (SOA), one or more services provided via a REST-Oriented Architecture (ROA), or combinations thereof. In an alternative embodiment, the social networking server 112 communicates directly with the databases 116-128 and includes a database client, engine, and/or module, for providing data to, modifying data stored within, and/or retrieving data from the one or more databases 116-128.

While the database server(s) 126 are illustrated as a single block, one of ordinary skill in the art will recognize that the database server(s) 126 may include one or more such servers. For example, the database server(s) 126 may include, but are not limited to, a Microsoft® Exchange Server, a Microsoft® Sharepoint® Server, a Lightweight Directory Access Protocol (LDAP) server, a MySQL database server, or any other server configured to provide access to one or more of the databases 116-128, or combinations thereof. Accordingly, and in one embodiment, the database server(s) 126 implemented by the social networking service are further configured to communicate with the social networking server 112.

Figure 2:
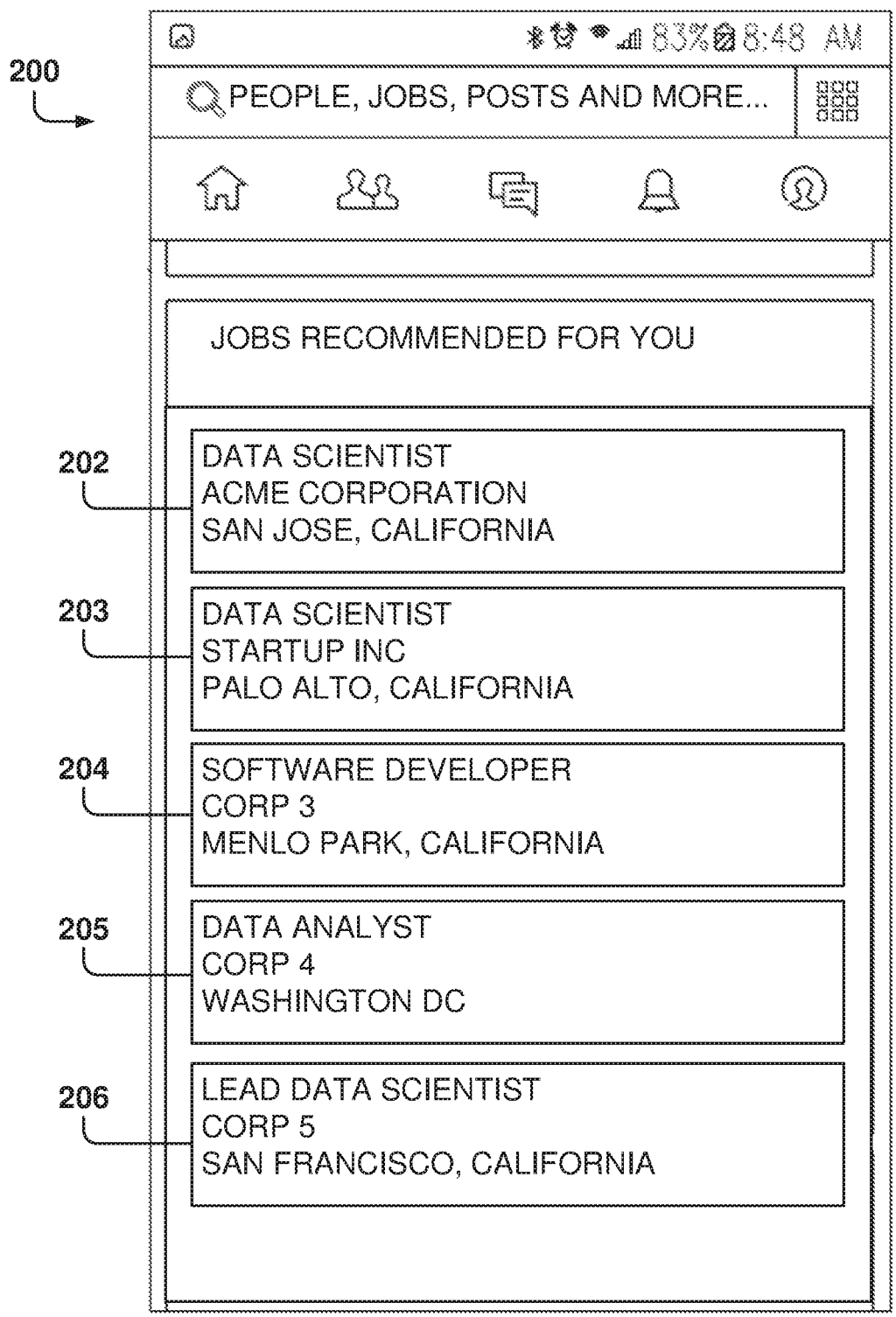
FIG. 2 is a screenshot of a user interface that includes job recommendations, according to some example embodiments.

FIG. 2 is a screenshot of a user interface 200 that includes recommendations for jobs 202-206, according to some example embodiments. In one example embodiment, the social network user interface provides job recommendations, which are job postings that match the job interests of the user and that are presented without a specific job search request from the user (e.g., job suggestions).

In another example embodiment, a job search interface is provided for entering job searches, and the resulting job matches are presented to the user in the user interface 200.

As the user scrolls down the user interface 200, more job recommendations are presented to the user. In some example embodiments, the job recommendations are prioritized to present jobs in an estimated order of interest to the user.

The user interface 200 presents a "flat" list of job recommendations as a single list. Other embodiments presented below utilize a "segmented" list of job recommendations where each segment is a group that is associated with a related reason indicating why these jobs are being recommended within the group.

Figure 3:
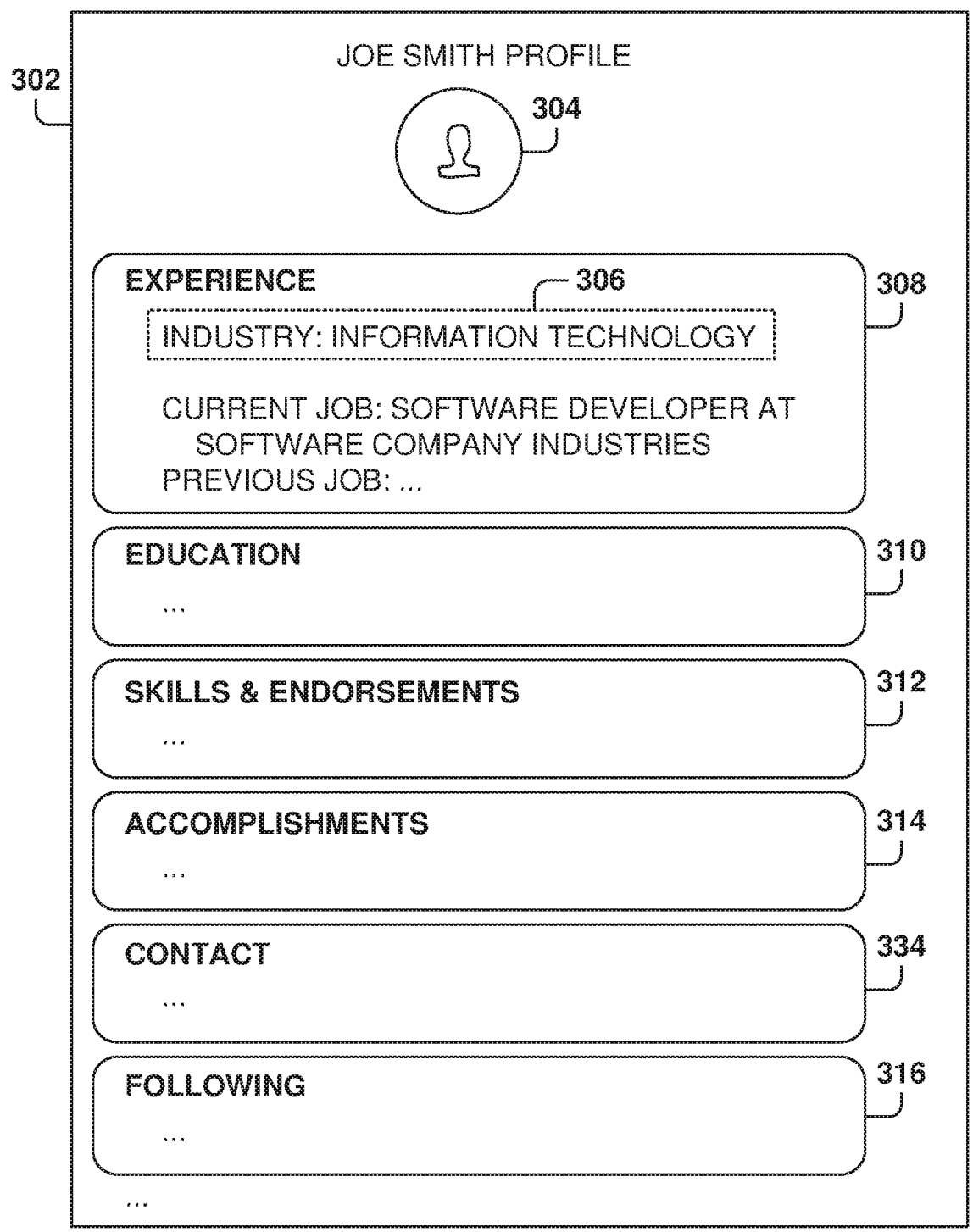
FIG. 3 is a screenshot of a user's profile view, according to some example embodiments.

FIG. 3 is a screenshot of a user's profile view, according to some example embodiments. Each user in the social network has a member profile 302, which includes information about the user. The member profile 302 is configurable by the user and also includes information based on the user's activity in the social network (e.g., likes, posts read).

In one example embodiment, the member profile 302 may include information in several categories, such as a profile picture 304, experience 308, education 310, skills and endorsements 312, accomplishments 314, contact information 334, following 316, and the like. Skills include professional competences that the member has, and the skills may be added by the member or by other members of the social network. Example skills include C++, Java, Object Programming, Data Mining, Machine Learning, Data Scientist, and the like. Other members of the social network may endorse one or more of the skills and, in some example embodiments, the member's account is associated with the number of endorsements received for each skill from other members.

The experience 308 information includes information related to the professional experience of the user. In one example embodiment, the experience 308 information includes an industry 306, which identifies the industry in which the user works. In one example embodiment, the user is given an option to select an industry from a plurality of industries when entering this value in the member profile 302. The experience 308 information area may also include information about the current job held by the user and previous jobs held by the user. By analyzing the job history of a user, the intercompany migrations may be determined. As used herein, an intercompany migration for a user takes place when the user moves from one company to another (e.g., the user changes the company where the user is working).

The education 310 information includes information about the educational background of the user, including the educational institutions attended by the user, the degrees obtained, and the field of study of the degrees. For example, a member may list that the member attended the University of Michigan and obtained a graduate degree in computer science.

The skills and endorsements 312 information includes information about professional skills that the user has identified as having been acquired by the user and endorsements entered by other users of the social network supporting the skills of the user. The accomplishments 314 area includes accomplishments entered by the user, and the contact information 334 includes contact information for the user, such as an email address and phone number. The following 316 area includes the names of entities in the social network being followed by the user.

Figure 4:
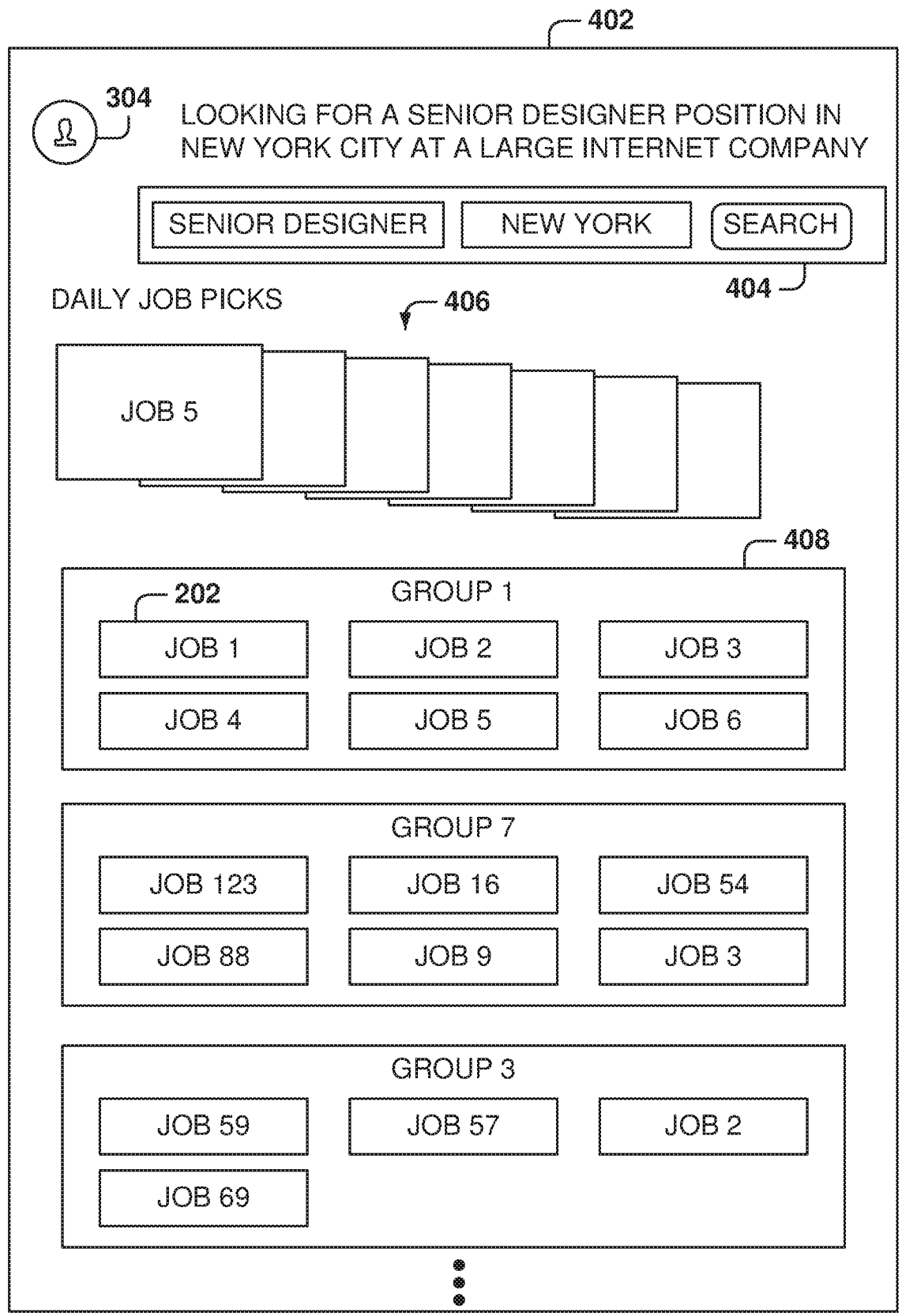
FIG. 4 is a diagram of a user interface, according to some example embodiments, for presenting job postings to a member of a social network.

FIG. 4 is a diagram of a user interface 402, according to some example embodiments, for presenting job postings to a member of the social network. The user interface 402 includes the profile picture 304 of the member, a search section 404, a daily jobs section 406, and one or more group areas 408. In some example embodiments, a message next to the profile picture 304 indicates the goal of the search, e.g., "Looking for a senior designer position in New York City at a large Internet company."

The search section 404, in some example embodiments, includes two boxes for entering search parameters: a keyword input box for entering any type of keywords for the search (e.g., job title, company name, job description, skill, etc.), and a geographic area input box for entering a geographic area for the search (e.g., New York). This allows members to execute searches based on keyword and location. In some embodiments, the geographic area input box includes one or more of city, state, ZIP Code, or any combination thereof.

In some example embodiments, the search boxes may be pre filled with the user's title and location if no search has been entered yet. Clicking the search button causes the search of jobs based on the keyword inputs and location. It is to be noted that the inputs are optional, and only one search input may be entered at a three or both search boxes may be filled in.

The daily jobs section 406 includes information about one or more jobs selected for the user, based on one or more parameters, such as member profile data, search history, job match to the member, recentness of the job, whether the user is following the job, and so forth.

Each group area 408 includes one or more jobs 202 for presentation in the user interface 402. In one example embodiment, the group area 408 includes one to six jobs with an option to scroll the group area 408 to present additional jobs, if available.

Each group area 408 provides an indication of why the r being presented with those jobs, which identifies the characteristic of the group. There could be several types of reasons related to the connection of the user to the job, the affinity of the member to the group, the desirability of the job, or the time deadline of the job (e.g., urgency). The reasons related to the connection of the user to the job may include relationships between the job and the social connections of the member (e.g., "Your connections can refer you to this set of jobs"), a quality of a fit between the job and the user characteristics (e.g., "This is a job from a company that hires from your school"), a quality of a match between the member's talent and the job (e.g., "You would be in the top 90% of all applicants), the number or frequency, of employees going from a given company to another company, and so forth.

Further, the group characteristics may be implicit (e.g., "These jobs are recommended based on your browsing history") or explicit (e.g., "These are jobs from companies you followed"). The desirability reasons may include popularity of the job in the member's area (e.g., most-viewed by other members or most applications received), jobs from in-demand start-ups in the member's area, and popularity of the job among people with the same title as the member. Further yet, the time-urgency reasons may include "Be the first to apply to these jobs," or "These jobs will be expiring soon."

It is to be noted that the embodiments illustrated in FIG. 4 are examples and do not describe every possible embodiment. Other embodiments may utilize different layouts or groups, present fewer or more jobs, present fewer or more groups, and so forth. The embodiments illustrated in FIG. 4 should therefore not be interpreted to be exclusive or limiting, but rather illustrative.

FIG. 5 is a detail of an intercompany-migration group area 408 in the user interface of FIG. 4, according to some example embodiments. In one example embodiment, the group area 408 is for a group referred to as an intercompany migration group, which provides an indication of how other members of the social network have "transitioned" from the same company where the member is working to other companies where coworkers obtained employment. An intercompany migration takes place when a member changes jobs and changes from working at a first company (the source company) to working at a second company (the destination company). In some example embodiments, the direct intercompany migrations are utilized, i.e., when a member goes directly from one company to another, but in other example embodiments, indirect intercompany migrations are also utilized, where an indirect intercompany migration takes place when a member goes to work at the destination company after working in an intermediate company, or companies, before making the migration.

In one example embodiment, the intercompany-migration group area 408 includes profile pictures 502 of people who migrated from the same company where the user is working (also referred to herein as the "employer" or the "employer company") to other companies. Other example embodiments may include names instead of, or in addition to, the profile pictures 502. If a profile picture is not available for a user, a "ghost" picture may be displayed, where a ghost picture is a generic icon for a user without a profile picture. In addition, the intercompany-migration group area 408 includes icons 504 of some of the companies where coworkers have migrated to, and a plurality of jobs 202 relevant to this group. It is noted that, in general, "coworkers" refers to members of the social network that are currently working for the current employer of the member or that previously worked for the current employer. If additional jobs related to the group are available for presentation, scroll selectors are available to view the additional jobs. Often, when discussing intercompany migrations, the term "coworker" refers to former employees of the employer company, because if the coworker still works for the employer, then there is no intercompany migration from the employer, unless the coworker returned to the employer company.

Each job 202 includes information about the job and information about the coworkers that joined the company offering the job. In some example embodiments, the job 202 description includes the job title, logo and name of the company, job location, and job statistics, such as the number of days since the job was first posted, the number of members who have viewed the job, and the number of applications for the job received in the social network. In addition, any combination of profile pictures, member names, and member titles may be included to identify the connections of the member to the job via 202 the member's colleagues.

Figure 6:
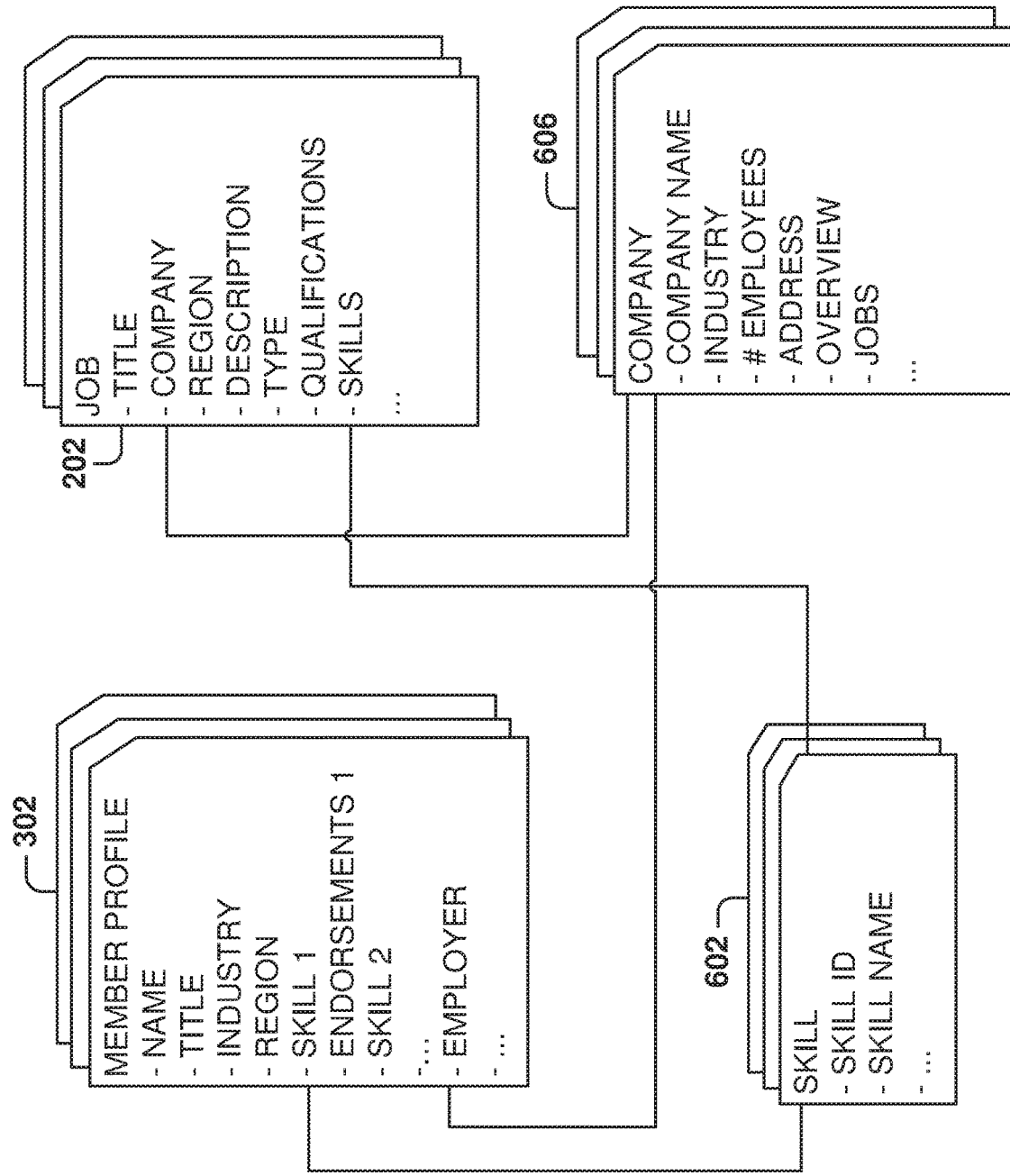
FIG. 6 illustrates data structures for storing job and member information, according to some example embodiments.

FIG. 6 illustrates data structures for storing job and member information, according to some example embodiments. The member profile 302, as discussed above, includes member information, such as name, title (e.g., job title), industry (e.g., legal services), geographic region, employer, skills and endorsements, and so forth. In some example embodiments, the member profile 302 also includes job-related data, such as jobs previously applied to, or jobs already suggested to the member (and how many times each job has been suggested to the member). Within the member profile 302, the skill information is linked to skill data 602, and the employer information is linked to company data 606.

In one example embodiment, the company data 606 includes company information, such as company name, industry associated with the company, number of employees at the company, address of the company, overview description of the company, job postings associated with the company, and the like The skill data 602 is a table for storing the different skills identified in the social network. In one example embodiment, the skill data 602 includes a skill identifier (ID) (e.g., a numerical value or a text string) and a name for the skill. The skill identifier may be linked to the member profile 302 and job 202 data.

In one example embodiment, the job 202 data includes data for jobs posted by companies in the social network. The job 202 data includes one or more of a title associated with the job (e.g., Software Developer), a company that posted the job, a geographic region where the job is located, a description of the job, a type of the job, qualifications required for the job, and one or more skills. The job 202 data may be linked to the company data 606 and the skill data 602.

It is to be noted that the embodiments illustrated in FIG. 6 are examples and do not describe every possible embodiment. Other embodiments may utilize different data structures or fewer data structures, combine the information from two data structures into one, have additional or fewer links among the data structures, and the like. The embodiments illustrated in FIG. 6 should therefore not be interpreted to be exclusive or limiting, but rather illustrative.

Figure 7A:
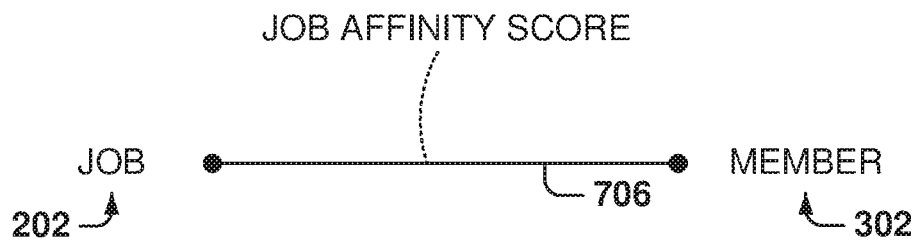
FIGS. 7A-7B illustrate the scoring of a job for a member, according to some example embodiments.
Figure 7B:
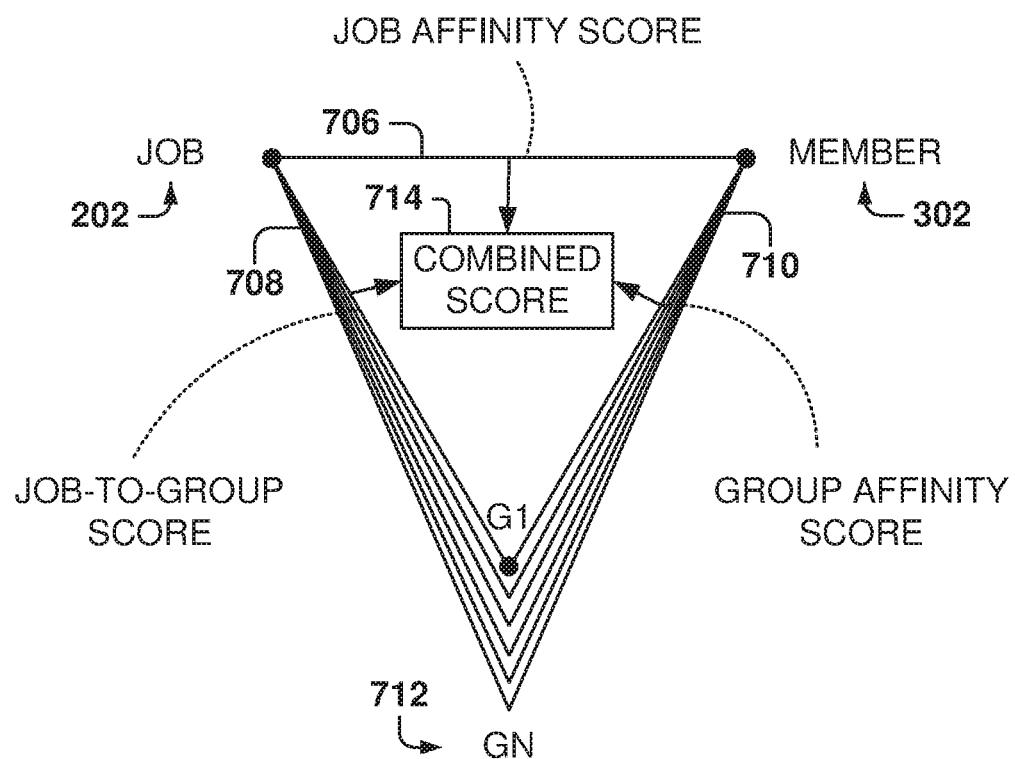

FIGS. 7A-7B illustrate the scoring of a job for a member, according to some example embodiments. FIG. 7A illustrates the scoring, also referred to herein as ranking, of a job 202 for a member associated with a member profile 302 based on a job affinity score 706.

The job affinity score 706, between a job and a member, is a value that measures how well the job matches the interest of the member in finding the job. A so called "dream job" for a member would be the perfect job for the member and would have a high, or even maximum, value, while a job that the member is not interested in at all (e.g., in a different professional industry) would have a low job affinity score 706. In some example embodiments, the job affinity score 706 is a value between zero and one, or a value between zero and 100, although other ranges are possible.

In some example embodiments, a machine-learning program is used to calculate the job affinity scores for the jobs available to the member. The machine-learning program is trained with existing data in the social network, and the machine-learning program is then used to evaluate jobs based on the features used by the machine-learning program in some example embodiments, the features include any combination of job data (e.g., job title, job description, company, geographic location, etc.), member profile data, member search history, employment of social connections of the member, job popularity in the social network, number of days the job has been posted, company reputation, company size, company age, profit vs. nonprofit company, and pay scale. More details are provided below with reference to FIG. 8 regarding the training and use of the machine-learning program.

FIG. 7B illustrates the scoring of a job 202 for a member associated with the member profile 302, according to some example embodiments, based on three parameters: the job affinity score 706, a job-to-group score 708, and a group affinity score 710. Broadly speaking, the job affinity score 706 indicates how relevant the job 202 is to the member, the job-to-group score 708 indicates how relevant the job 202 is to a group 712, and the group affinity score 710 indicates how relevant the group 712 is to the member.

The group affinity score 710 indicates how relevant the group 712 is to the member, where a high affinity score indicates that the group 712 is very relevant to the member and should be presented in the user interface, while a low affinity score indicates that the group 712 is not relevant to the member and may be omitted from presentation in the user interface.

The group affinity score 710 is used, in some example embodiments, to determine which groups 712 are presented in the user interface, as discussed above, and the group affinity score 710 is also used to order the groups 712 when presenting them in the user interface, such that the groups 712 may be presented in the order of their respective group affinity scores 710. It is to be noted that if there is not enough "liquidity" of jobs for a group 712 (e.g., there are not enough jobs for presentation in the group 712), the group 712 may be omitted from the user interface or presented with lower priority, even if the group affinity score 710 is high.

In some example embodiments, a machine-learning program is utilized for calculating the group affinity score 710. The machine-learning program is trained with member data, including interactions of users with the different groups 712.

The data for the particular member is then utilized by the machine-learning program to determine the group affinity score 710 for the member with respect to a particular group 712. The features utilized by the machine-learning program include the history of interaction of the member with jobs from the group 712, click data for the member (e.g., a click rate based on how many times the member has interacted with the group 712), member interactions with other members who have a relationship to the group 712, and the like. For example, one feature may include an attribute that indicates if the member is a student, and if the member is a student, features such as social connections or education-related attributes will be important to determine which groups are of interest to the student. On the other hand, a member who has been out of school for 20 years or more may not be as interested in education-related features.

Another feature of interest to determine group participation is whether the member has worked in small companies or large companies throughout a long career. If the member exhibits a pattern of working for large companies, a group that provides jobs for large companies would likely be of more interest to the member than a group that provides jobs in small companies, unless there are other factors, such as recent interaction of the member with jobs from small companies.

The job-to-group score 708 between a job 202 and a group 712 indicates the job 202's strength within the context of the group 712, where a high job-to-group score 708 indicates that the job 202 is a good candidate for presentation within the group 712 and a low job-to-group score 708 indicates that the job 202 is not a good candidate for presentation within the group 712. In some example embodiments, a predetermined threshold is identified, wherein jobs 202 with a job-to-group score 708 equal to or above the predetermined threshold are included in the group 712 and jobs 202 with a job-to-group score 708 below the predetermined threshold are not included in the group 712.

For example, in a group 712 that presents jobs for the intercompany-migration group, if there is a job 202 for a company, the job-to-group score 708 indicates how often coworkers are migrating to get jobs in the company of the job 202. In another example, in a group within the social network of the member, if there is a job 202 for a company within the network of the member, the job-to-group score 708 indicates how strong the member's network is for reaching the company of the job 202.

In some example embodiments, the job affinity score 706, the job-to-group score 708, and the group affinity score 710 are combined to obtain a combined score 714 for the job 202. The scores may be combined utilizing addition, weighted averaging, or other mathematical operations.

FIG. 7B illustrates that, for a given job 202 and member profile 302, there may be a plurality of groups 712 G1, . . . , GN. Embodiments presented herein identify which jobs fit better in which group, and which groups have higher priority for presentation to the member.

In the intercompany-migration group, the job-to-group score 708 measures how many coworkers of the member made the transition from the employer to the company associated with the job posting. It provides an indication of whether the company is hiring relatively few or many people working for the employer of the member. This is useful, because if the company is hiring relatively many coworkers, then the member has a better chance of landing the job with the company. Also, the member may benefit from working with former colleagues, and the member may have connections that may help land the job.

Figure 8:
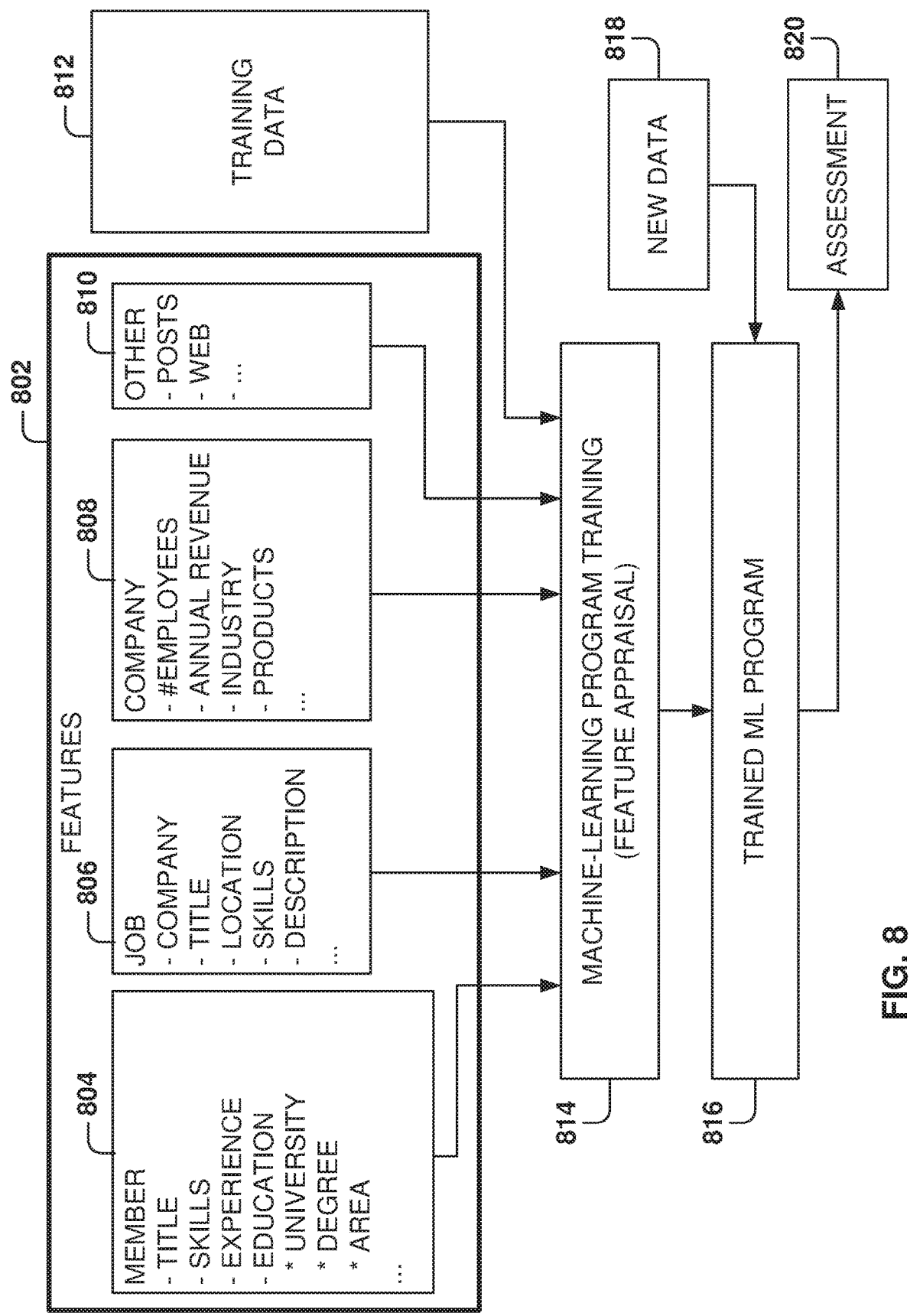
FIG. 8 illustrates the training and use of a machine-learning program, according to some example embodiments.

FIG. 8 illustrates the training and use of a machine-learning program 816, according to some example embodiments. In some example embodiments, machine-learning programs, also referred to as machine-learning algorithms or tools, are utilized to perform operations associated with job searches.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 812 in order to make data-driven predictions or decisions expressed as outputs or assessments 820. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for classifying or scoring job postings.

In general, there are two types of problems in machine learning: classification problems and regression problems. Classification problems aim at classifying items into one of several categories (for example, is this object an apple or an orange?). Regression algorithms aim at quantifying some items (for example, by providing a value that is a real number). In some embodiments, example machine-learning algorithms provide a job affinity score 706 (e.g., a number from 1 to 100) to qualify each job as a match for the user (e.g., calculating the job affinity score). In other example embodiments, machine learning is also utilized to calculate the group affinity score 710 and the job-to-group score 708. The machine-learning algorithms utilize the training data 812 to find correlations among identified features 802 that affect the outcome.

In one example embodiment, the features 802 may be of different types and may include one or more of member features 804, job features 806, company features 808, and other features 810. The member features 804 may include one or more of the data in the member profile 302, as described in FIG. 6, such as title, skills, experience, education, and the like. The job features 806 may include any data related to the job 202, and the company features 808 may include any data related to the company. In some example embodiments, additional features in the other features 810 may be included, such as post data, message data, web data, and the like.

With the training data 812 and the identified features 802, the machine-learning tool is trained at operation 814. The machine-learning tool appraises the value of the features 802 as they correlate to the training data 812. The result of the training is the trained machine-learning program 816.

When the machine-learning program 816 is used to perform an assessment, new data 818 is provided as an input to the trained machine-learning program 816, and the machine-learning program 816 generates the assessment 820 as output. For example, when a member performs a job search, a machine-learning program, trained with social network data, uses the member data and job data from the jobs in the database to search for jobs that match the member's profile and activity.

Figure 9:
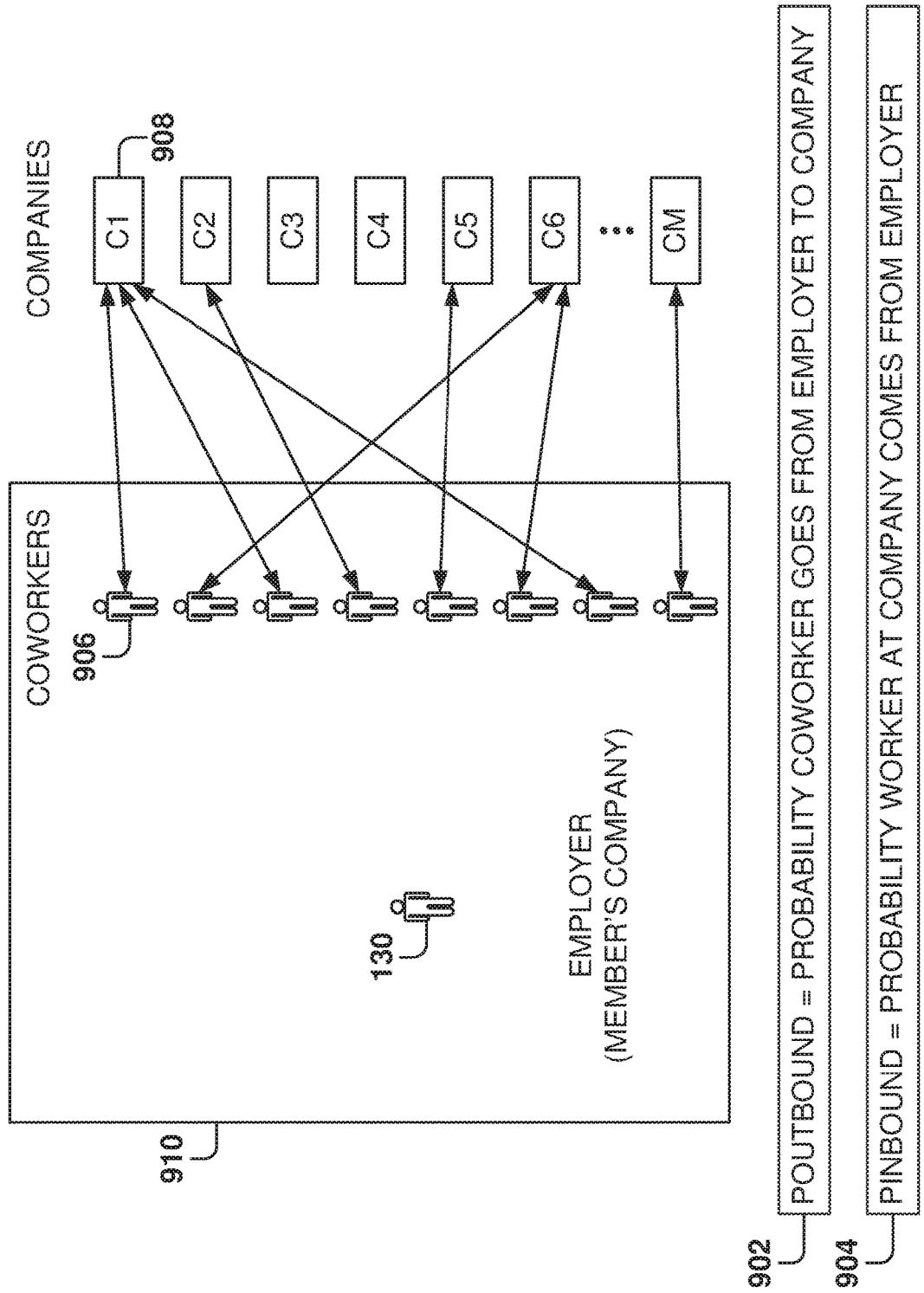
FIG. 9 illustrates the transitions of members between companies, according to some example embodiments.

FIG. 9 illustrates the transitions of members between companies, according to some example embodiments. The intercompany migration group is related to the transitions, of coworkers 906 of the user 130, from an employer 910 to other companies 908 $C_1$-$C_M$. The goal is to find companies 908 that are hiring people from the member's employer 910.

In some example embodiments, all the coworkers 906 of the employer 910 are considered for the analysis, while in other embodiments, the analysis takes into consideration only the coworkers 906 with the same job function or job title as the job. In other example embodiments, only the coworkers 906 with the same skill set as the user 130 are utilized.

The analysis for the intercompany migration group searches for coworker 906 transitions to identify the companies 908 where the coworkers 906 found jobs. For example, some companies tend to hire from competitors. If the user 130 wants to go to a competitor, then the user 130 is probably interested in looking at jobs at competitors that are hiring a large number of coworkers 906.

In some example embodiments, two transition probabilities are calculated, referred to as an outbound probability Poutbound 902 and an inbound probability Pinbound 904. The outbound probability Poutbound 902 measures the probability that a member goes from the employer 910 to a company 908, and the inbound probability Pinbound 904 measures the probability that a worker of a company comes from the employer 910 (e.g., worked previously for the employer).

The social network has information regarding the intercompany migrations because most members of the social network include their job history in their profiles. Therefore, in one example embodiment, the probabilities are calculated utilizing member profile data from the social network.

The outbound probability Poutbound 902 between the employer 910 and a company 908 is calculated as the number of people from the employer 910 who joined the company 908 divided by the number of people from the employer 910 who joined the company 908 as well as other companies, that is, the fraction of people that joined the company 908 after quitting from the employer 910 compared to everyone that quit from the employer 910. In some embodiments, time limits may be utilized for the probability calculations, such as by taking into account only coworkers 906 that worked for the employer 910 within the last year, or the last 5 years, or some other identified period.

The outbound probability is good for comparing large companies. In other example embodiments, the probabilities are based on weighted values related to the amount of time elapsed since a member joined the company, where recent transitions have higher weights than older transitions.

If the outbound probability were utilized exclusively, then small companies would be missed, because their probabilities would be much smaller than those of large companies. Therefore, the inbound probability is used to include jobs from small companies because the inbound probability provides the perspective from the company, not from the employer.

The inbound probability Pinbound 904 is calculated as the number of people from the employer 910 who joined the company 908 divided by the number of people from the employer 910 as well as other companies who joined the company 908, that is, the fraction of people that joined the company 908 after quitting from the employer 910 compared to everyone that joined the company 908. Therefore, the difference between the inbound probability and the outbound probability is the denominator used in the calculation.

For example, if there is a 10-person startup formed by five former employees of the employer, the probability that the startup will hire m the employer is high because the inbound probability is 0.5. However, since the startup is very small, the outbound probability would be very small if the employer has a large number of employees.

Figure 10:
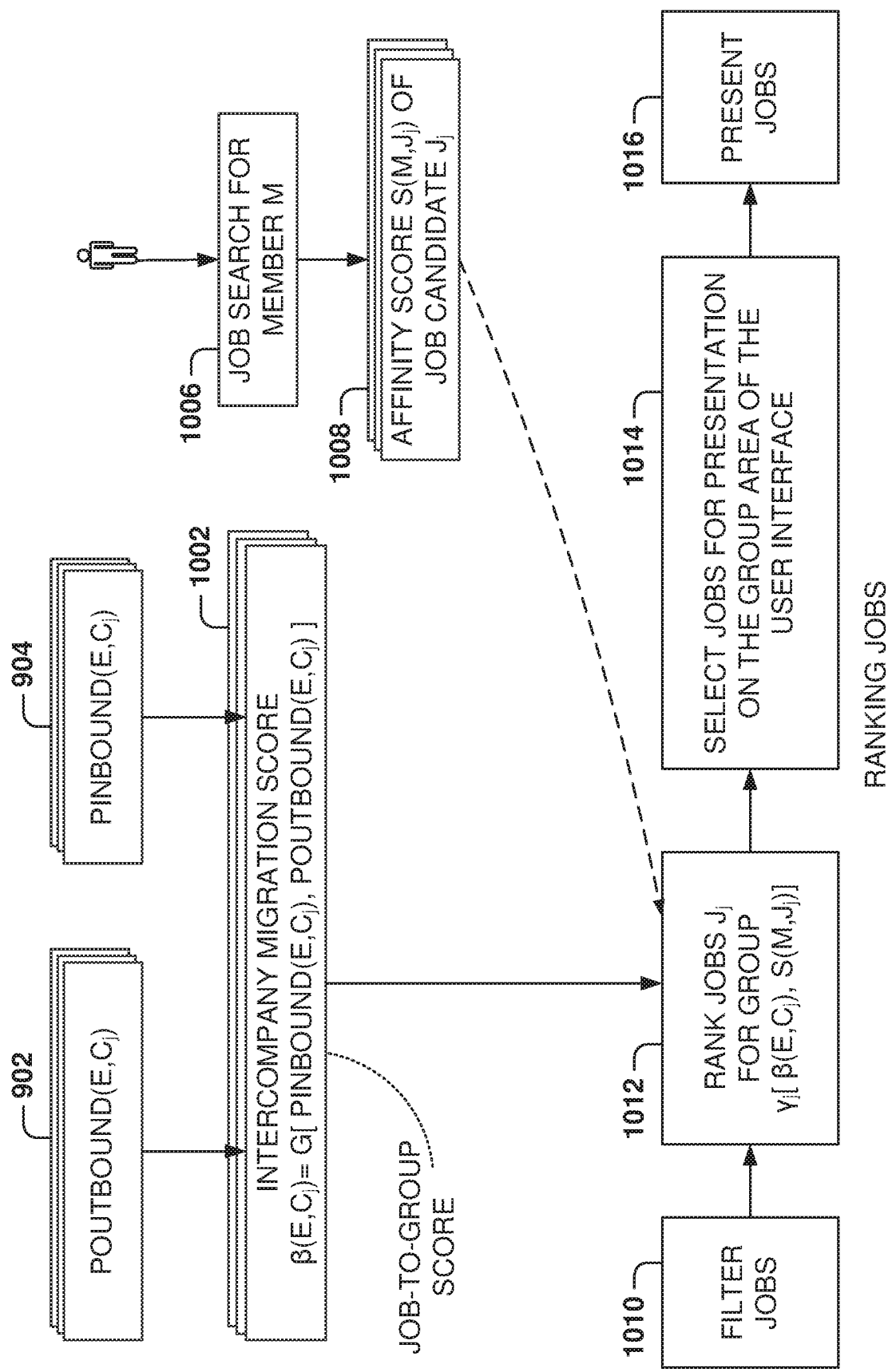
FIG. 10 illustrates a method for selecting jobs for presentation within a group, according to some example embodiments.

FIG. 10 illustrates a method for selecting jobs for presentation within a group, according to some example embodiments. The outbound probabilities Poutbound 902 are calculated for each pair of employer E and company $C_j$, represented as Poutbound(E, $C_j$). In addition, the inbound probabilities Pinbound 904 are calculated for each pair, represented as Pinbound(E, $C_j$).

An intercompany migration score $\beta$ 1002 is calculated based on the outbound probability Poutbound 902 and the inbound probability Pinbound 904. The intercompany migration score between the employer E and a company $C_j$ is referred to as $\beta$(E, $C_j$), and is calculated utilizing a function G based oar Poutbound(E, $C_j$) and Pinbound(E, $C_j$). In one example embodiment, the G function is the average of Poutbound(E, $C_j$) and Pinbound(E, $C_j$), but in other embodiments, other functions may be utilized, such as the sum, a weighted average of the two values, the harmonic mean of the two values, the geometric mean of the two values and the like.

The intercompany migration score $\beta$ 1002 is the job-to-group score 708 for the intercompany-migration group. It is to be noted that some values may be pre-calculated before a job search is performed for a user. For example, the intercompany migration scores may be calculated for, at least, the most common pairs of companies. Further, the group affinity score 710 for a given member may be pre-calculated also.

At operation 1006, a job search is performed for member M. The job search may be originated by the member or may be originated by the social network in order to propose job postings to the member. The result 1008 is a plurality of job candidates $J_j$ for presentation to the member based on their affinity scores S(M, $J_j$).

At operation 1010, which is optional in some embodiments, the candidate jobs may be filtered. In one example embodiment, the candidate jobs having a job-to-group score higher than a predetermined threshold are considered. In this case, the jobs from companies with an intercompany migration score $\beta$ 1002 greater than the predetermined threshold are considered. In other example embodiments, all the candidate jobs are considered and filtering is not performed.

At operation 1012, a member-job-company score $\gamma_j$(M, $J_j$, $C_j$) is calculated for each job $J_j$ by combining the intercompany migration score $\beta$(E, $C_j$), where $C_j$ is the company posting job $J_j$, and the job affinity score S(M, $J_j$). The combination may be performed by multiplying the scores, by adding the scores, by performing a weighted multiplication, by performing a weighted addition, by calculating the geometric mean or the average, and so forth.

The candidate jobs are then ranked according to their member-job-company score $\gamma_j$, where the best jobs for the member M will be at the top of the ranked list of candidate jobs. In some example embodiments, the machine-learning program is used to rank the jobs based on their $\beta$ and S scores. The machine-learning program is trained with activity data of members of the social network, and then the member activity and the different job-related scores are used to rank the jobs for the member.

At operation 1014, a predetermined number of the top job candidates is selected for presentation in the group area of the user interface. For example, six jobs may be presented per group (as long as there are six jobs available for each group), or a different number of jobs may be presented per group, such as a number in the range from one to ten. Further, in some example embodiments, groups with higher rankings may present more jobs than groups with lower rankings. For example, a top group may present ten jobs, and each of the remaining groups may present four jobs.

At operation 1016, the selected jobs are presented in the user interface. It is to be noted that the different groups are ranked according to their scores and then placed in the order of their ranking in the user interface.

Figure 11:
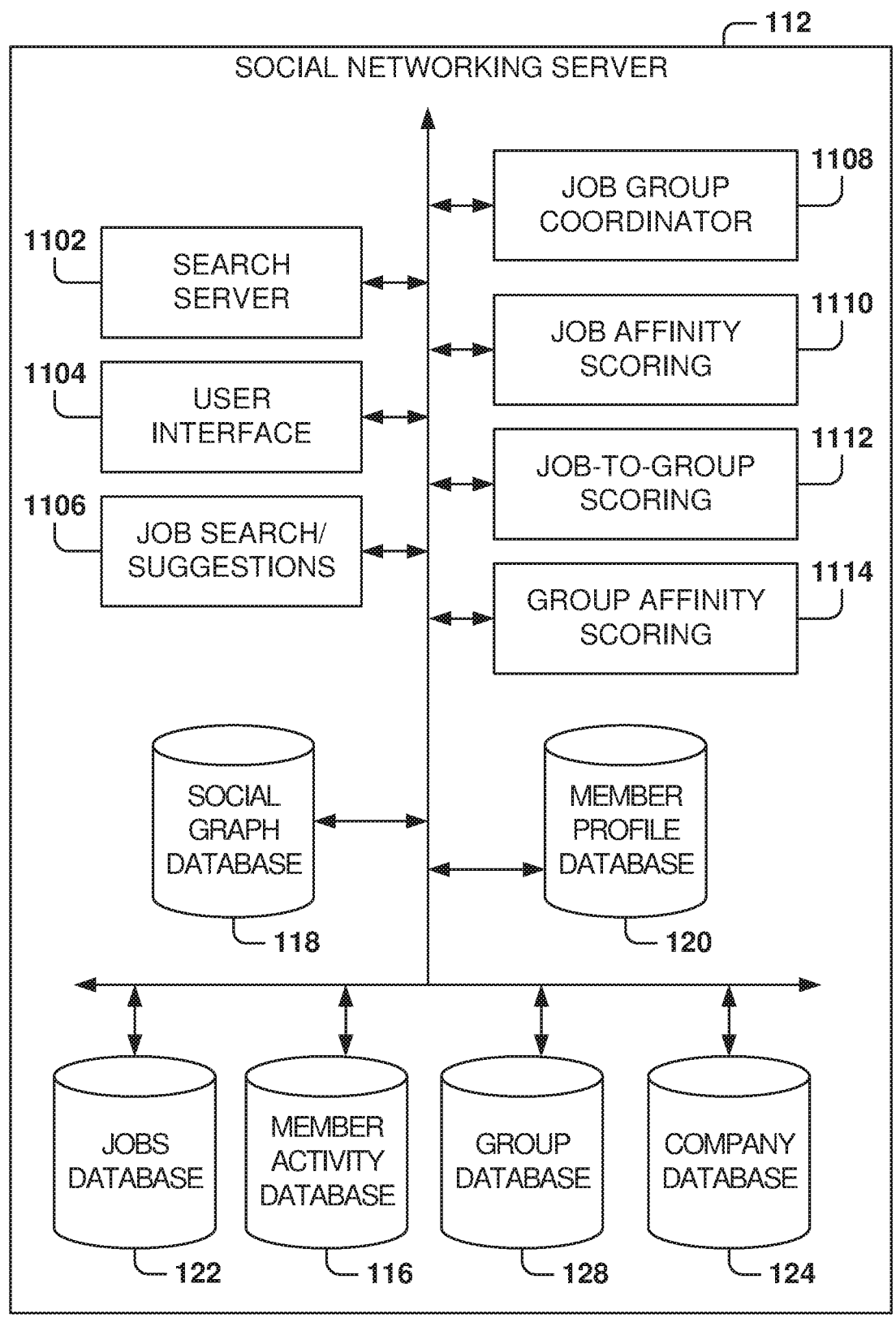
FIG. 11 illustrates a social networking server for implementing example embodiments.

FIG. 11 illustrates a social networking server 112 for implementing example embodiments. In one example embodiment, the social networking server 112 includes a search server 1102, a user interface module 1104, a job search/suggestions engine 1106, a job group coordinator server 1108, a job affinity scoring server 1110, a job-to-group scoring server 1112, a group affinity scoring server 1114, and a plurality of databases, which include the social graph database 118, the member profile database 120, the jobs database 122, the member activity database 116, the group database 128, and the company database 124.

The search server 1102 performs data searches on the social network, such as searches for members or companies. In some example embodiments, the search server 1102 includes a machine-learning algorithm for performing the searches, which utilizes a plurality of features for selecting and scoring the jobs. The features include, at least, one or more of title, industry, skills, member profile, company profile, job title, job data, region, and salary range. The user interface module 1104 communicates with the client devices 104 to exchange user interface data for presenting the user interface to the user. The job search/suggestions engine 1106 performs job searches based on a search query (e.g., using one or more keywords and a geographic location as illustrated in FIG. 4) or based on a member profile in order to offer job suggestions.

The job affinity scoring server 1110 calculates the job affinity scores, as illustrated above with reference to FIGS. 7A-7B and 8-10. The job-to-group scoring server 1112 calculates the job-to-group scores, as illustrated above with reference to FIGS. 7B and 8-10. The group affinity scoring server 1114 calculates the group affinity scores, as illustrated above with reference to FIGS. 7B and 8-10.

The job group coordinator server 1108 calculates the combined score for the scores identified above. The job group coordinator server 1108 further ranks the different groups in order to determine the priority of presentation of the groups in the user interface and which groups will be presented or omitted. In addition, the job group coordinator server 1108 may determine in which group to present a job, if the job could be presented in two or more groups.

It is to be noted that the embodiments illustrated in FIG. 11 are examples and d not describe every possible embodiment. Other embodiments may utilize different servers or additional servers, combine the functionality of two or more servers into a single server, utilize a distributed server pool, and so forth. The embodiments illustrated in FIG. 11 should therefore not be interpreted to be exclusive or limiting, but rather illustrative.

Figure 12:
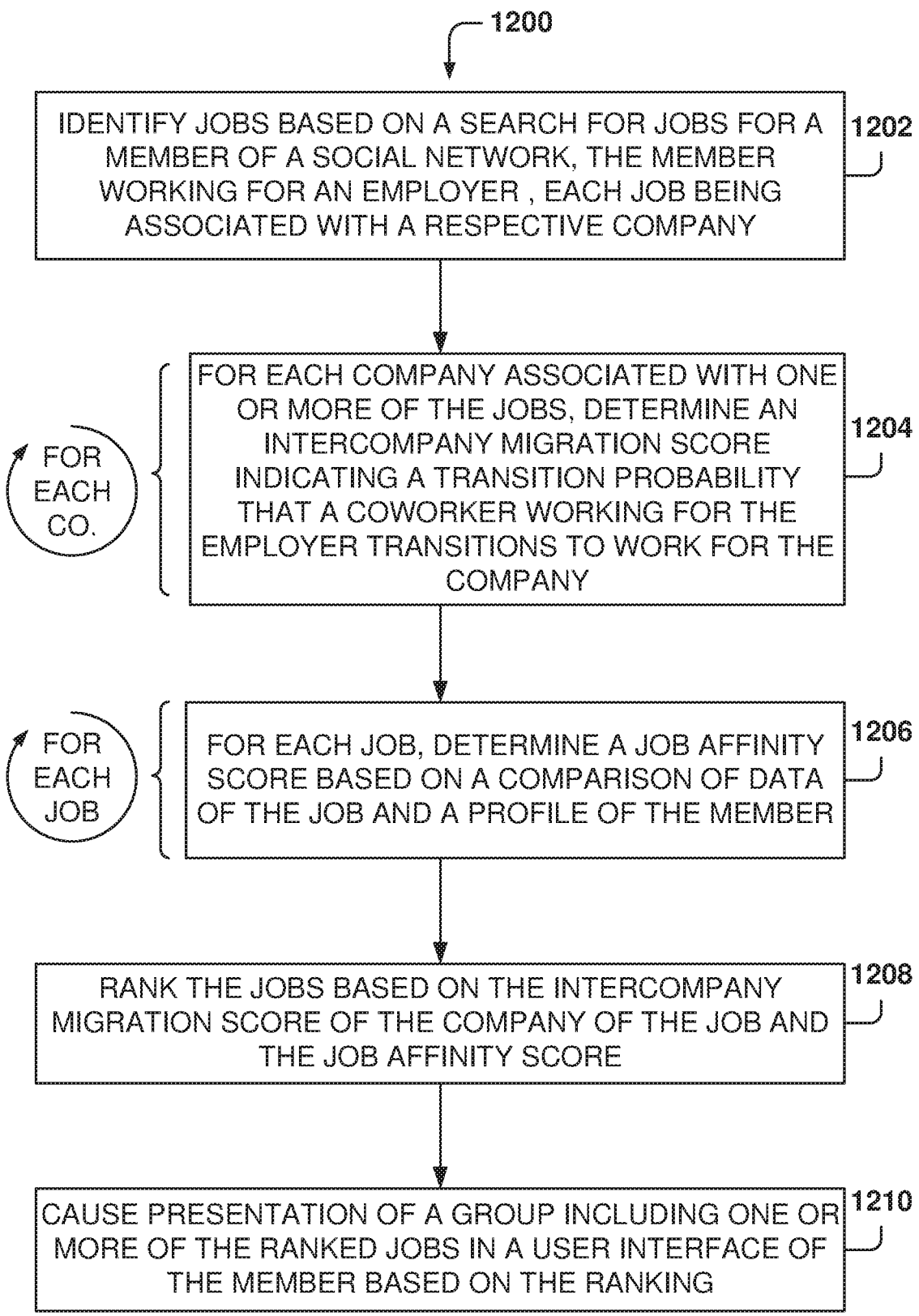
FIG. 12 is a flowchart of a method, according to some example embodiments, for searching job postings for a member of a social network based on the transitions of members between companies.

FIG. 12 is a flowchart of a method 1200, according to some example embodiments, for searching job postings for a member of a social network based on the transitions of members between companies. While the various operations in this flowchart are presented and described sequentially, one of ordinary skill will appreciate that some or all of the operations may be executed a different order, be combined or omitted, or be executed in parallel. Operation 1202 is for identifying, by a server having one or more processors, jobs based on a search for jobs for a member of a social network, where the member works for an employer and each job is associated with a respective company.

From operation 1202, the method 1200 flows to operation 1204 where the server determines, for each company associated with one or more of the jobs, an intercompany migration score indicating a transition probability that a coworker working for the employer transitions to work for the company.

Further, at operation 1206, the server determines, for each job, a job affinity score based on a comparison of data of the job and a profile of the member. From operation 1206, the method 1200 flows to operation 1208, where the server ranks the jobs based on the intercompany migration score of the company of the job and the job affinity score.

From operation 1208, the method 1200 flows to operation 1210, where the server causes presentation of a group including one or more of the ranked jobs in a user interface of the member based on the ranking.

In one example, the method 1200 calculates an outbound probability of a transition from the employer to a company as a number of coworkers that transitioned from the employer to the company divided by a number of employees in the employer. Further, the method 1200 calculates an inbound probability of a transition from the employer to a company as a number of coworkers that transitioned from the employer to the company divided by a number of employees in the company. Further yet, determining the intercompany migration score between the employer and the company is based on the inbound probability and the outbound probability.

In another example, determining the job affinity score is performed by a machine-learning program based on the data of the job and the profile of the member, with the machine-learning program being trained utilizing data of job postings in the social network and data of members of the social network.

In another example, transitions from the employer to the company are assigned weights based on a time when an employee joined the company, where recent transitions are given higher weights for calculating the intercompany migration score than older transitions.

In some example embodiments, the user interface for presentation of the group further includes indications of coworkers that migrated to other companies.

In other examples, the user interface for presentation of the group presents a predetermined number of jobs with an option for scrolling to see additional jobs.

In one example, the user interface further presents additional groups, where the groups are sorted based on respective job affinity scores of jobs within each group, group affinity scores for each group, and job-to-group scores for each group.

In some examples, the method 1200 further includes calculating a group affinity score for the member based on interactions of the member related to job searches or job applications for a plurality of companies.

Figure 13:
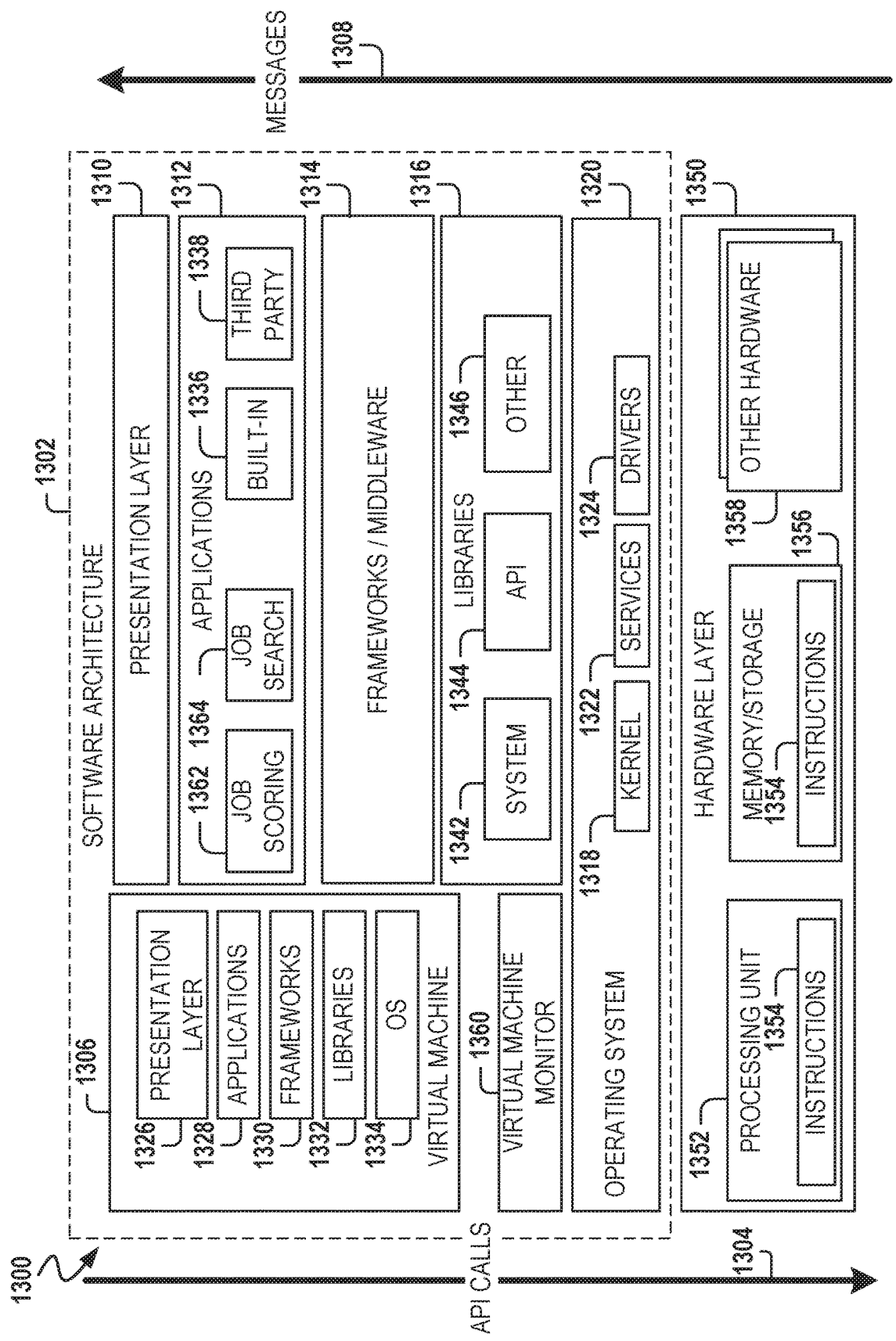
FIG. 13 is a block diagram illustrating an example of a software architecture that may be installed on a machine, according to some example embodiments.

FIG. 13 is a block diagram 1300 illustrating a representative software architecture 1302, which may be used in conjunction with various hardware architectures herein described. FIG. 13 is nerdy a non-limiting example of a software architecture 1302, and it will be appreciated that many other architectures may be implemented to facilitate the functionality described herein. The software architecture 1302 may be executing on hardware such as a machine 1400 of FIG. 14 that includes, among other things, processors

1404, memory/storage 1406, and input/output (I/O) components 1418. A representative hardware layer 1350 is illustrated and can represent, for example, the machine 1400 of FIG. 14. The representative hardware layer 1350 comprises one or more processing units 1352 having associated executable instructions 1354. The executable instructions 1354 represent the executable instructions of the software architecture 1302, including implementation of the methods, modules, and so forth of FIGS. 1-6, 8, and 10-12. The hardware layer 1350 also includes memory and/or storage modules 1356, which also have the executable instructions 1354. The hardware layer 1350 may also comprise other hardware 1358, which represents any other hardware of the hardware layer 1350, such as the other hardware illustrated as part of the machine 1400.

In the example architecture of FIG. 13, the software architecture 1302 may be conceptualized as a stack of layers where each layer provides particular functionality. For example, the software architecture 1302 may include layers such as an operating system 1320, libraries 1316, frameworks/middleware 1314, applications 1312, and a presentation layer 1310. Operationally, the applications 1312 and/or other components within the layers may invoke API calls 1304 through the software stack and receive a response, returned values, and so forth illustrated as messages 1308 in response to the API calls 1304. The layers illustrated are representative in nature, and not all software architectures have all layers. For example, some mobile or special-purpose operating systems may not provide a frameworks/middleware layer 1314, while others may provide such a layer. Other software architectures may include additional or different layers.

The operating system 1320 may manage hardware resources and provide common services. The operating system 1320 may include, for example, a kernel 1318, services 1322, and drivers 1324. The kernel 1318 may act as an abstraction layer between the hardware and the other software layers. For example, the kernel 1318 may be responsible for memory management, processor management (e.g., scheduling), component management, networking, security settings, and so on. The services 1322 may provide other common services for the other software layers. The drivers 1324 may be responsible for controlling or interfacing with the underlying hardware. For instance, the drivers 1324 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1316 may provide a common infrastructure that may be utilized by the applications 1312 and/or other components and/or layers. The libraries 1316 typically provide functionality that allows other software modules to perform tasks in an easier fashion than by interfacing directly with the underlying operating system 1320 functionality (e.g., kernel 1318, services 1322, and/or drivers 1324). The libraries 1316 may include system libraries 1342 (e.g., C standard library) that may provide functions such as memory allocation functions, string manipulation functions, mathematic functions, and the like. In addition, the libraries 1316 may include API libraries 1344 such as media libraries (e.g., libraries to support presentation and manipulation of various media formats such as MPEG4, H.264, MP3, AAC, AMR, JPG, PNG), graphics libraries (e.g., an OpenGL framework that may be used to render two-dimensional and three-dimensional graphic content on a display), database libraries (e.g., SQLite that may provide various relational database functions), web libraries (e.g., WebKit that may provide web browsing functionality), and the like. The libraries 1316 may also include a wide variety of other libraries 1346 to provide many other APIs to the applications 1312 and other software components/modules.

The frameworks 1314 (also sometimes referred to as middleware) may provide a higher-level common infrastructure that may be utilized by the applications 1312 and/or other software components/modules. For example, the frameworks 1314 may provide various graphic user interface (GUI) functions, high-level resource management, high-level location services, and so forth. The frameworks 1314 may provide a broad spectrum of other APIs that may be utilized by the applications 1312 and/or other software components/modules, some of which may be specific to a particular operating system or platform.

The applications 1312 include job-scoring applications 1362 job search/suggestions 1364, built-in applications 1336, and third-party applications 1338. The job-scoring applications 1362 comprise the job-scoring applications, as discussed above with reference to FIG. 11. Examples of representative built-in applications 1336 may include, but are not limited to, a contacts application, a browser application, a book reader application, a location application, a media application, a messaging application, and/or a game application. The third-party applications 1338 may include any of the built-in applications 1336 as well as a broad assortment of other applications. In a specific example, the third-party application 1338 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 1338 may invoke the API calls 1304 provided by the mobile operating system such as the operating system 1320 to facilitate functionality described herein.

The applications 1312 may utilize built-in operating system functions (e.g., kernel 1318, services 1322, and/or drivers 1324), libraries (e.g., system libraries 1342, API libraries 1344, and other libraries 1346), or frameworks/middleware 1314 to create user interfaces to interact with users of the system. Alternatively, or additionally, in some systems, interactions with a user may occur through a presentation layer, such as the presentation layer 1310. In these systems, the application/module "logic" can be separated from the aspects of the application/module that interact with a user.

Some software architectures utilize virtual machines. In the example of FIG. 13, this is illustrated by a virtual machine 1306. A virtual machine creates a software environment where applications/modules can execute as if they were executing on a hardware machine (such as the machine 1400 of FIG. 14, for example). The virtual machine 1306 is hosted by a host operating system (e.g., operating system 1320 in FIG. 13) and typically, although not always, has a virtual machine monitor 1360, which manages the operation of the virtual machine 1306 as well as the interface with the host operating system (e.g., operating system 1320). A software architecture executes within the virtual machine 1306, such as an operating system 1334, libraries 1332, frameworks/middleware 1330, applications 1328, and/or a presentation layer 1326. These layers of software architecture executing within the virtual machine 1306 can be the same as corresponding layers previously described or may be different.

Figure 14:
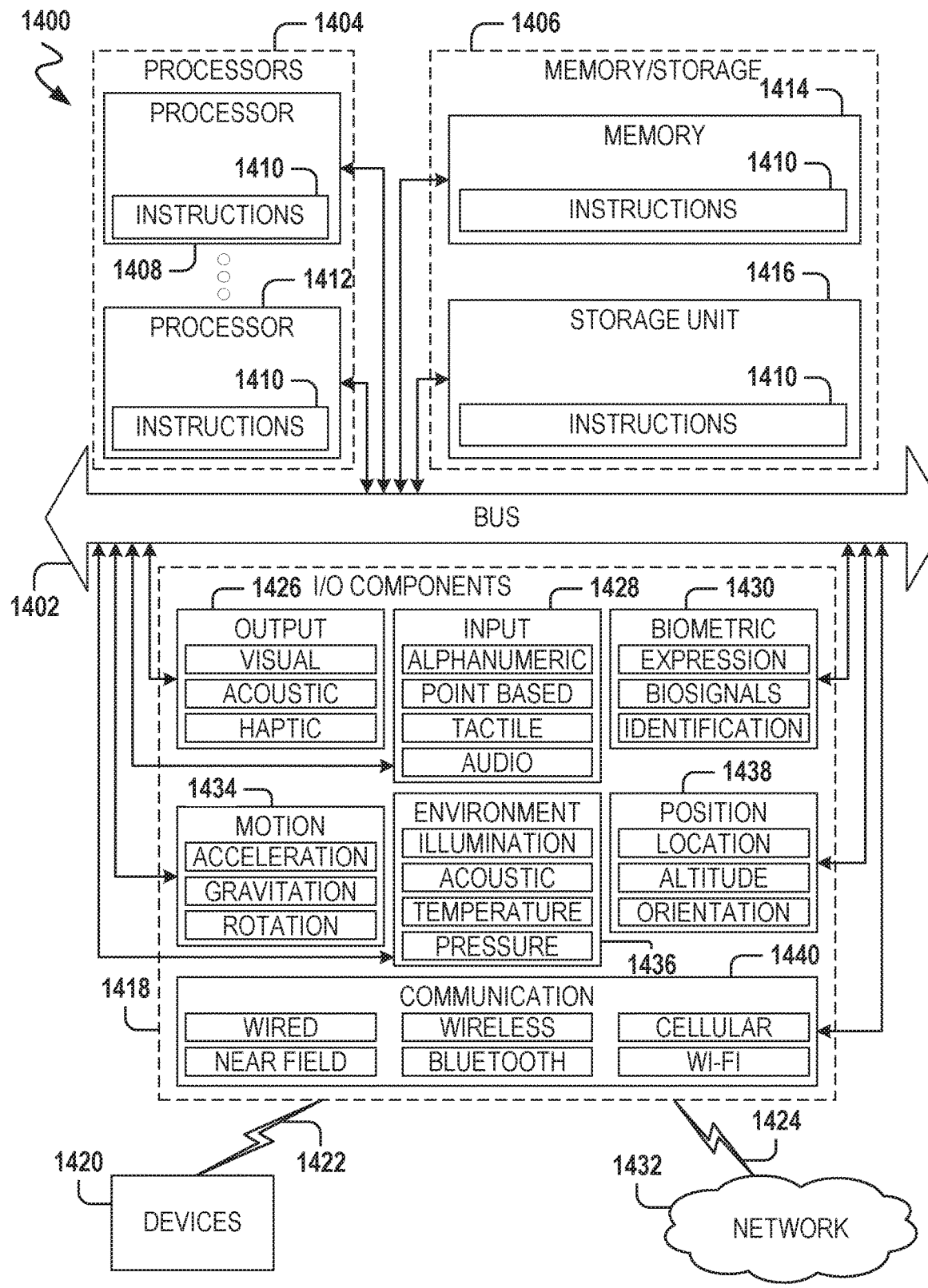
FIG. 14 is a diagrammatic representation of a machine in the form of a computer system within which a set of instructions may be executed for causing the machine to perform any one or more of the methodologies discussed herein, according to an example embodiment.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1410 (e.g., software, a program, an application, an applet, an app, or other executable code) for causing the machine 1400 to perform any one or more of the methodologies discussed herein may be executed. For example, the instructions 1410 may cause the machine 1400 to execute the flow diagrams of FIGS. 10 and 12. Additionally, or alternatively, the instructions 1410 may implement the job-scoring programs and the machine-learning programs associated with them. The instructions 1410 transform the general, non-programmed machine 1400 into a particular machine 1400 programmed to carry out the described and illustrated functions in the manner described.

In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a switch, a controller, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1410, sequentially or otherwise, that specify actions to be taken by the machine 1400. Further, while only a single machine 1400 is illustrated, the term "machine" shall also be taken to include a collection of machines 1400 that individually or jointly execute the instructions 1410 to perform any one or more of the methodologies discussed herein.

The machine 1400 may include processors 1404, memory/storage 1406, and I/O components 1418, which may be configured to communicate with each other such as via a bus 1402. In an example embodiment, the processors 1404 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1408 and a processor 1412 that may execute the instructions 1410. The term "processor" is intended to include multi-core processors that may comprise two or more independent processors (sometimes referred to as "cores") that may execute instructions contemporaneously. Although FIG. 14 shows multiple processors 1404, the machine 1400 may include a single processor with a single core, a single processor with multiple cores (e.g., a multi-core processor), multiple processors with a single core, multiple processors with multiples cores, or any combination thereof.

The memory/storage 1406 may include a memory 1414, such as a main memory, or other memory storage, and a storage unit 1416, both accessible to the processors 1404 such as via the bus 1402. The storage unit 1416 and memory 1414 store the instructions 1410 embodying any one or more of the methodologies or functions described herein. The instructions 1410 may also reside, completely or partially, within the memory 1414, within the storage unit 1416, within at least one of the processors 1404 (e.g., within the processor's cache memory), or any suitable combination thereof, during execution thereof by the machine 1400. Accordingly, the memory 1414, the storage unit 1416, and the memory of the processors 1404 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media e.g., a centralized or distributed database, or associated caches and servers) able to store the instructions 1410. The term "machine-readable medium" shall also be taken to include any medium, or combination of multiple media, that is capable of storing instructions (e.g., instructions 1410) for execution by a machine (e.g., machine 1400), such that the instructions, when executed by one or more processors of the machine (e.g., processors 1404), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1418 may include a wide variety of components to receive input, provide output, produce output, transmit information, exchange information, capture measurements, and so on. The specific I/O components 1418 that are included in a particular machine will depend on the type of machine. For example, portable machines such as mobile phones will likely include a touch input device or other such input mechanisms, while a headless server machine will likely not include such a touch input device. It will be appreciated that the I/O components 1418 may include many other components that are not shown in FIG. 14. The I/O components 1418 are grouped according to functionality merely for simplifying the following discussion, and the grouping is in no way limiting. In various example embodiments, the I/O components 1418 may include output components 1426 and input components 1428. The output components 1426 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1418 may include biometric components 1430, motion components 1434, environmental components 1436, or position components 1438 among a wide array of other components. For example, the biometric components 1430 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1434 may include acceleration sensor components (e.g., accelerometer), gravitation sensor components, rotation sensor components (e.g., gyroscope), and so forth. The environmental components 1436 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1438 may include location sensor components (e.g., a OPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1418 may include communication components 1440 operable to couple the machine 1400 to a network 1432 or devices 1420 via a coupling 1424 and a coupling 1422, respectively. For example, the communication components 1440 may include a network interface component or other suitable device to interface with the network 1432. In further examples, the communication components 1440 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1420 may be another machine or any of a wide variety of peripheral devices (e.g., a peripheral device coupled via a USB).

Moreover, the communication components 1440 may detect identifiers or include components operable to detect identifiers. For example, the communication components 1440 may include Radio Frequency Identification (RFID) tag reader components, NEC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1440, such as location via Internet Protocol (IP) geo-location, location via Wi-Fi® signal triangulation, location via detecting an NFC beacon signal that may indicate a particular location, and so forth.

In various example embodiments, one or more portions of the network 1432 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 1432 or a portion of the network 1432 may include a wireless or cellular network and the coupling 1424 may be a Code Division Multiple Access (CDMA) connection, a Global System for Mobile communications (GSM) connection, or another type of cellular or wireless coupling. In this example, the coupling 1424 may implement any of a variety of types of data transfer technology, such as Single Carrier Radio Transmission Technology (1xRTT), Evolution-Data Optimized (EN/DO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide interoperability for Microwave Access (WiMAX), Long Term Evolution (LTE) standard, others defined h various standard-setting organizations, other long range protocols, or other data transfer technology.

The instructions 1410 may be transmitted or received over the network 1432 using a transmission medium via a network interface device (e.g., a network interface component included in the communication components 1440) and utilizing any one of a number of well-known transfer protocols (e.g., hypertext transfer protocol (HTTP)). Similarly, the instructions 1410 may be transmitted or received using a transmission medium via the coupling 1422 (e.g., a peer-to-peer coupling) to the devices 1420. The term "transmission medium" shall be taken to include any intangible medium that is capable of storing, encoding, or carrying the instructions 1410 for execution by the machine 1400, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
    identifying, by a server having one or more processors, a plurality of online job postings based on a search for online job postings for a member of a social networking service, the member having a member profile indicating current employment with a first company, each online job posting in the plurality of online job postings being associated with a respective company;
    for each respective company associated with an online job posting in the plurality of online job postings, determining, by the server, an intercompany migration score indicating a probability that an employee of the first company will transition to an employment position at the respective company, the intercompany migration score for the respective company derived based on historical information in member profiles of members of the social networking service indicating a member has transitioned from the first company to an employment position at the respective company;
    for each online job posting, determining, by the server, a job affinity score based on a comparison of data of the online job posting and the member profile of the member;
    wherein determining the job affinity score is performed by a machine-learning program based on the data of the online job posting and the member profile of the member, the machine-learning program having been trained utilizing data of online job postings in the social networking service and data of members of the social networking service;
    deriving a ranking score, by the server, for each online job posting in the plurality of online job postings based on a combination of the intercompany migration score of the respective company associated with the online job posting and the job affinity score; and
    presenting in single user interface a plurality of groups of online job postings, each online job posting in a respective group sharing a common characteristic by which the online job postings have been grouped, and wherein one group includes a plurality of online job postings having a ranking score exceeding a predetermined threshold.

2. The method as recited in claim 1, wherein the intercompany migration score for a respective company associated with an online job posting in the plurality of online job postings is based on an outbound probability of a transition of an employee from the first company to the respective company associated with the online job posting, the method further comprising:
    calculating the outbound probability as the number of employees of the first company who transitioned from the first company to the respective company in a predetermined time period, divided by the number of employees of the first company who transitioned from the first company to all companies.

3. The method as recited in claim 1, wherein the intercompany migration score for a respective company associated with an online job posting in the plurality of online job postings is based on an inbound probability of a transition of an employee from the first company to the respective company associated with the online job posting, the method further comprising:
    calculating the inbound probability as the number of employees of the first company who transitioned from the first company to the respective company in a predetermined time period, divided by the number of members of the social networking service who transitioned from any company to the respective company.

4. The method as recited in claim 1, wherein the intercompany migration score for a respective company associated with an online job posting in the plurality of online job postings is based on a combination of an inbound probability score and an outbound probability score, the method further comprising:
    calculating the outbound probability as the number of employees of the first company who transitioned from the first company to the respective company in a predetermined time period, divided by the number of employees of the first company who transitioned from the first company to all companies; and
    calculating the inbound probability as the number of employees of the first company who transitioned from the first company to the respective company in a predetermined time period, divided by the number of members of the social networking service who transitioned from any company to the respective company.

5. The method as recited in claim 1, wherein transitions of an employee of the first company from the first company to a respective company associated with an online job posting in the plurality of online job postings are assigned weights based on a when the employee transitioned from the first company to the respective company, wherein more recent transitions are given higher weights than older transitions for determining the intercompany migration score.

6. The method as recited in claim 1, further comprising:
    presenting in the single user interface with the particular group of online job postings that includes a plurality of online job postings having a ranking score exceeding a predetermined threshold information, for each online job posting in the particular group, indicating an employee of the first company who transitioned to an employment position at the respective company associated with a respective online job posting.

7. The method as recited in claim 1, wherein the single user interface for presentation of the particular group of online job postings includes presentation of a predetermined number of online job postings with an option for scrolling to see additional online job postings.

8. The method as recited in claim 1, wherein the plurality of groups of online job postings presented in the single user interface are ordered in accordance with a group affinity score assigned to each group of online job postings for the member, the group affinity score representing a measure of relevance of the common characteristic shared by each online job posting in a particular group.

9. The method as recited in claim 1, further comprising: calculating the group affinity score for the member based on interactions of the member related to job searches or job applications for a plurality of companies.

10. A system comprising:
a memory comprising instructions; and
one or more computer processors, wherein the instructions, when executed by the one or more computer processors, cause the one or more computer processors to perform operations comprising:
identifying a plurality of online job postings based on a search for online job postings for a member of a social networking service, the member having a member profile indicating current employment with a first company, each online job posting in the plurality of online job postings being associated with a respective company;
for each respective company associated with an online job posting in the plurality of online job postings, determining an intercompany migration score indicating a probability that an employee of the first company will transition to an employment position at the respective company, the intercompany migration score for the respective company derived based on historical information in member profiles of members of the social networking service indicating a member has transitioned from the first company to an employment position at the respective company;
for each online job posting, determining a job affinity score based on a comparison of data of the online job posting and the member profile of the member;
wherein determining the job affinity score is performed by a machine-learning program based on the data of the online job posting and the member profile of the member, the machine-learning program having been trained utilizing data of online job postings in the social networking service and data of members of the social networking service;
deriving a ranking score for each online job posting in the plurality of online job postings based on a combination of the intercompany migration score of the respective company associated with the online job posting and the job affinity score; and
presenting in single user interface a plurality of groups of online job postings, each online job posting in a respective group sharing a common characteristic by which the online job postings have been grouped, and wherein one group includes a plurality of online job postings having a ranking score exceeding a predetermined threshold.

11. The system as recited in claim 10, wherein the instructions further cause the one or more computer processors to perform operations comprising:
calculating an outbound probability of a transition of an employee of the first company to a respective company associated with an online job posting as the number of employees of the first company who transitioned from the first company to an employment position with the respective company associated with the online job posting, divided by the number of employees of the first company who transitioned from the first company to all companies.

12. The system as recited in claim 11, wherein the instructions further cause the one or more computer processors to perform operations comprising:
calculating an inbound probability of a transition of an employee of the first company from the first company to a respective company associated with an online job posting as the number of employees of the first company who transitioned from the first company to the respective company associated with the online job posting, divided by the number of members of the social networking service who transitioned from any company to the respective company.

13. The system as recited in claim 12, wherein determining the intercompany migration score for a respective company associated with an online job posting is based on a combination of the inbound probability and the outbound probability for the respective company.

14. A non-transitory machine-readable storage medium including instructions that, when executed by a machine, cause the machine to perform operations comprising:
identifying a plurality of online job postings based on a search for online job postings for a member of a social networking service, the member having a member profile indicating current employment with a first company, each online job posting in the plurality of online job postings being associated with a respective company;
for each respective company associated with an online job posting in the plurality of online job postings, determining an intercompany migration score indicating a probability that an employee of the first company will transition to an employment position at the respective company, the intercompany migration score for the respective company derived based on historical information in member profiles of members of the social networking service indicating a member has transitioned from the first company to an employment position at the respective company;
for each online job posting, determining a job affinity score based on a comparison of data of the online job posting and the member profile of the member;
wherein determining the job affinity score is performed by a machine-learning program based on the data of the online job posting and the member profile of the member, the machine-learning program having been trained utilizing data of online job postings in the social networking service and data of members of the social networking service;
deriving a ranking score for each online job posting in the plurality of online job postings based on a combination of the intercompany migration score of the respective company associated with the online job posting and the job affinity score; and
presenting in single user interface a plurality of groups of online job postings, each online job posting in a respective group sharing a common characteristic by which the online job postings have been grouped, and wherein one group includes a plurality of online job postings having a rankinq score exceeding a predetermined threshold.

15. The machine-readable storage medium as recited in claim 14, wherein the machine further performs operations comprising:
calculating an outbound probability of a transition of an employee of the first company to a respective company associated with an online job posting as the number of employees of the first company who transitioned from the first company to an employment position with the respective company associated with the online job posting, divided by the number of employees of the first company who transitioned from the first company to all companies.

16. The machine-readable storage medium as recited in claim 15, wherein the machine further performs operations comprising:

calculating an inbound probability of a transition of an employee of the first company from the first company to a respective company associated with an online job posting as the number of employees of the first company who transitioned from the first company to the respective company associated with the online job posting, divided by the number of members of the social networking service who transitioned from any company to the respective company.

17. The machine-readable storage medium as recited in claim 16, wherein determining the intercompany migration score for a respective company associated with an online job posting is based on a combination of the inbound probability and the outbound probability for the respective company.

\* \* \* \* \*

UNITED STATES PATENT AND TRADEMARK OFFICE
CERTIFICATE OF CORRECTION

PATENT NO. : 10,783,497 B2
APPLICATION NO. : 15/437649
DATED : September 22, 2020
INVENTOR(S) : Kenthapadi et al.

Page 1 of 1

It is certified that error appears in the above-identified patent and that said Letters Patent is hereby corrected as shown below:

In the Claims

In Column 26, Line 57, in Claim 14, delete "rankinq" and insert --ranking-- therefor Signed and Sealed this
Eighth Day of December, 2020

Andrei Iancu
*Director of the United States Patent and Trademark Office*